(12) United States Patent
Welguisz et al.

(10) Patent No.: US 8,335,881 B2
(45) Date of Patent: Dec. 18, 2012

(54) METHOD AND APPARATUS FOR HANDLING AN INTERRUPT DURING TESTING OF A DATA PROCESSING SYSTEM

(75) Inventors: David M. Welguisz, Round Rock, TX (US); Gary R. Morrison, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 341 days.

(21) Appl. No.: 12/748,096

(22) Filed: Mar. 26, 2010

(65) Prior Publication Data
US 2011/0238878 A1   Sep. 29, 2011

(51) Int. Cl.
*G06F 13/24* (2006.01)
(52) U.S. Cl. ........ 710/262; 710/240; 710/200; 711/100; 714/726
(58) Field of Classification Search .......... 710/260–269, 710/200, 240–244; 714/726; 711/100
See application file for complete search history.

(56) References Cited

U.S. PATENT DOCUMENTS

| | | | |
|---|---|---|---|
| 4,831,623 A | 5/1989 | Terzian | |
| 5,679,759 A | 10/1997 | Wittmann et al. | |
| 5,862,366 A * | 1/1999 | Schmidt et al. | 703/21 |
| 5,875,342 A | 2/1999 | Temple | |
| 5,937,199 A | 8/1999 | Temple | |
| 5,954,825 A | 9/1999 | Kaiser et al. | |
| 6,189,112 B1 | 2/2001 | Siegel et al. | |
| 6,202,186 B1 | 3/2001 | Oonk | |
| 6,502,208 B1 | 12/2002 | McLaughlin et al. | |
| 6,804,631 B2 | 10/2004 | Kelley et al. | |
| 6,959,407 B2 | 10/2005 | Six | |
| 7,047,442 B2 | 5/2006 | Sutton | |
| 7,058,834 B2 | 6/2006 | Woods et al. | |
| 7,269,780 B2 | 9/2007 | Arima et al. | |
| 7,444,568 B2 * | 10/2008 | Morrison et al. | 714/726 |
| 7,467,325 B2 | 12/2008 | Eisen et al. | |
| 7,966,536 B2 | 6/2011 | Ludewig et al. | |
| 7,971,111 B1 | 6/2011 | Swarnkar et al. | |
| 8,006,144 B2 | 8/2011 | Hughes | |
| 8,131,487 B2 | 3/2012 | Thibedeau et al. | |
| 2003/0093728 A1 | 5/2003 | Sutton | |
| 2003/0115525 A1 | 6/2003 | Hill et al. | |
| 2004/0138845 A1 | 7/2004 | Park et al. | |
| 2007/0118779 A1 | 5/2007 | Wu et al. | |
| 2011/0238878 A1 | 9/2011 | Weiguisz et al. | |

FOREIGN PATENT DOCUMENTS

| EP | 1256870 A2 | 11/2002 |
|---|---|---|
| WO | 2007103591 A1 | 9/2007 |

OTHER PUBLICATIONS

U.S. Appl. No. 12/748,108, Inventor Gary R. Morrison, "Method and Apparatus for Testing a Data Processing System", filed Mar. 26, 2010, Office Action-Rejection, mailed Aug. 29, 2012.

* cited by examiner

*Primary Examiner* — Brian Misiura
*Assistant Examiner* — Kim Huynh
(74) *Attorney, Agent, or Firm* — Joanna G. Chiu; David G. Dolezal

(57) ABSTRACT

A method for handling an interrupt during testing of at least one logic block of a processor includes performing a test on at least one logic block of a processor; during the performing, receiving an interrupt; determining a progress status of the test in response to receiving the interrupt; and determining when the processor responds to an interrupt, wherein the determining when the processor responds to an interrupt is based on the progress of the test.

16 Claims, 7 Drawing Sheets

METHOD AND APPARATUS FOR HANDLING AN INTERRUPT DURING TESTING OF A DATA PROCESSING SYSTEM

CROSS-REFERENCE TO RELATED APPLICATION(S)

This application is related to U.S. patent application Ser. No. 12/748,108, filed on even date, entitled "METHOD AND APPARATUS FOR TESTING A DATA PROCESSING SYSTEM," naming Gary R. Morrison as inventor, and assigned to the current assignee hereof.

Background

1. Field

The present invention relates generally to data processing systems, and more specifically, to testing a data processing system.

2. Related Art

Testing of data processing systems is important to ensure proper operation. Testing may be performed in the factory after manufacture prior to using the data processing system in a user application. This ensures that an end user receives a properly functioning product. However, during operation of the data processing system by the end user, it may also be desirable to continuously test the data processing system so that failures which may occur during normal operation of the product can be detected.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
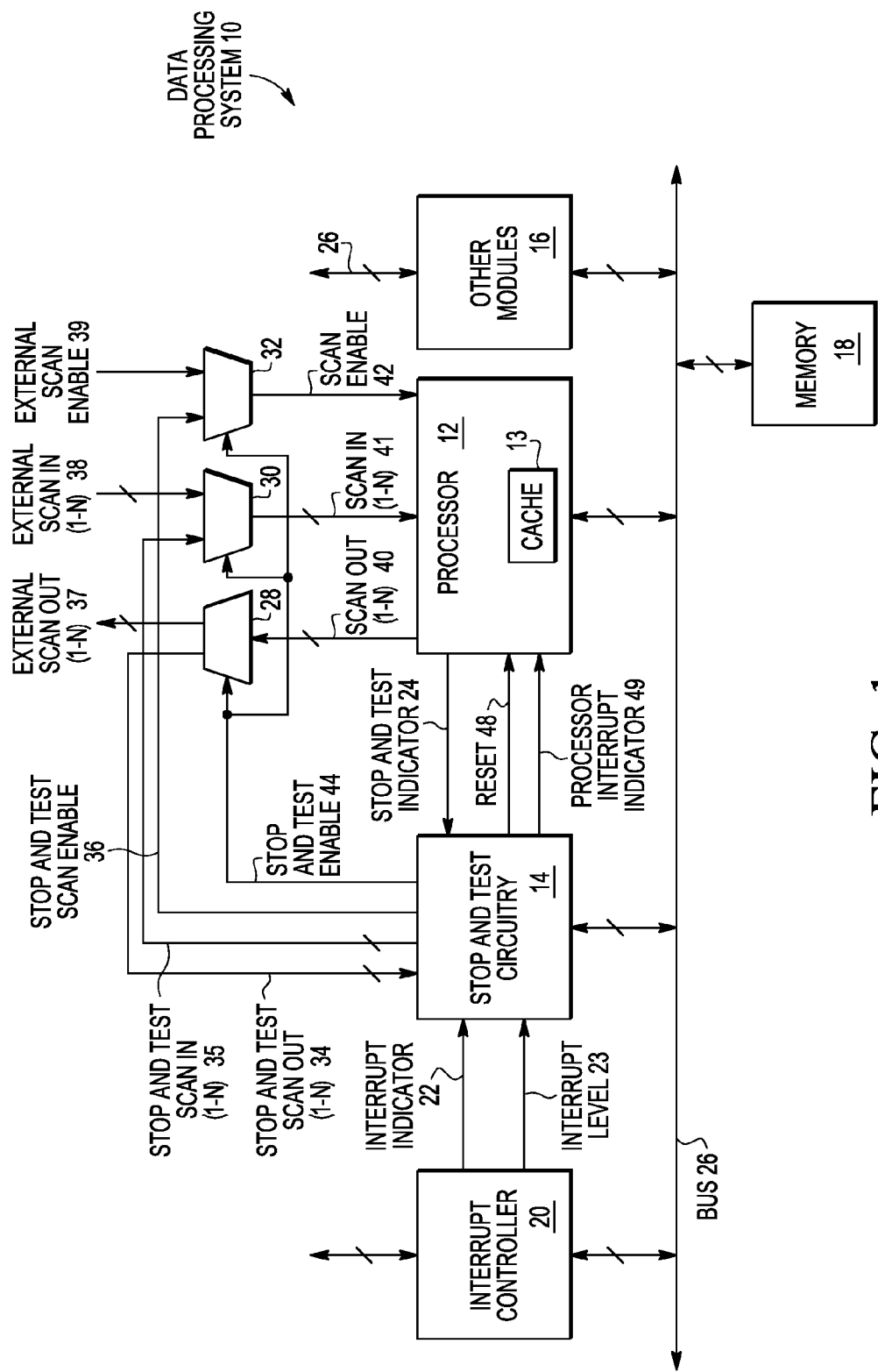
FIG. 1 illustrates, in block diagram form, a data processing system in accordance with one embodiment of the present invention.

After a data processing system is manufactured and delivered to an end user, testing during normal operation may be desirable to ensure that the data processing system is still functioning properly. For example, a data processing system may be used within an automobile, where testing of this data processing system is desired after a user purchases the automobile. Fragments of test code can be executed periodically during operation to test the data processing system. However, this test code typically provides non-uniform and incomplete test coverage. This test code is also typically slow and inefficient for testing the data processing system. Furthermore, these test codes have to be fault graded which is both time consuming and complex.

Another alternative is scan testing. Scan testing may be used to easily provide higher test coverage. However, if traditional scan testing is performed during operation, the current state of the processor is lost each time scan testing is performed. Therefore, software may be used to direct intrusive testing of a data processing system during normal operation, where intrusive testing may refer to testing which affects or loses the state of the data processing system. For example, scan test methodology in combination with logic built in self test (LBIST) may be used to test during normal operation. For example, a stop and test instruction is used to initiate the testing. However, even if testing can be initiated during normal operation by a stop and test instruction, such as when the processor would otherwise be idle and waiting for an interrupt, interrupt frequencies can be so high that no meaningful testing may result between interrupts. Therefore, in one embodiment, the test state of the processor can be saved upon an interrupt such that testing during normal operation can be stopped and continued with a subsequent stop and test instruction. Furthermore, in order to further improve testing, one embodiment allows for the filtering of interrupts during the testing.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" or "deassert" are used when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one. Therefore, each signal described herein may be designed as positive or negative logic, where negative logic can be indicated by a bar over the signal name or an asterix (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, those signals described as positive logic signals may be implemented as negative logic signals, and those signals described as negative logic signals may be implemented as positive logic signals.

FIG. 1 illustrates, in block diagram form, a data processing system 10 in accordance with one embodiment of the present invention. Data processing system 10 includes a processor 12, stop and test circuitry 14, interrupt controller 20, other modules 16, memory 18, and bus 26. Processor 12, interrupt controller 20, stop and test circuitry 14, other modules 16, and memory 18 are all bidirectionally coupled to bus 26. Other modules 16 may include any type and number of modules, such as, for example, other memories, processors, co-processors, input/output devices, timers, or any other type of peripherals. Alternatively, no other modules may be present in data processing system 10. Memory 18 may be any type of memory, such as, for example, read only memory (ROM), random access memory (RAM), etc. In one embodiment, user applications which are executed by processor 12 are stored in memory 18. Also, in the illustrated embodiment, processor 12 includes a cache 13.

Stop and test circuitry 14 is coupled to interrupt controller 20 and processor 12. Interrupt controller 20 provides an interrupt indicator 22 and a corresponding interrupt level 23 to stop and test circuitry 14. Stop and test circuitry 14 provides a reset 48 to processor 12, a processor interrupt indicator 49 to processor 12, and receives a stop and test indicator 24 from processor 12. Also, data processing system 10 includes multiplexers (MUXes) 30 and 32 and demultiplexer (deMUX) 28, each receiving a stop and test enable 44. Processor 12 outputs scan out (1-N) 40 to deMUX 28, which, based on stop and test enable 44, are provided as stop and test scan out (1-N) 34 to stop and test circuitry 14 or as external scan out (1-N) 37. MUX 30 receives stop and test scan in (1-N) 35 from stop and test circuitry 14 and external scan in (1-N) 38 and, based on stop and test enable 44, provides one of these as scan in (1-N) 41 to processor 12. MUX 32 receives stop and test scan enable 36 from stop and test circuitry 14 and external scan enable 39 and, based on stop and test enable 44, provides one of these as scan enable 42 to processor 12. Note that N in FIG. 1 represents any integer greater than zero, and corresponds to the number of scan chains present in processor 12. Therefore, note that MUX 30 may include N MUXes and deMUX 28 may include N deMUXes. Also, in an alternate embodiment, deMUX 28 may not be present. For example, the scan inputs may simply be ignored when scan testing is not being performed.

External scan out (1-N) 37, external scan in (1-N) 38, and external scan enable 39 may each be routed to external pads or pins of data processing system 10. Alternatively, any of these external signals can be multiplexed onto a lesser number of external pads or pins. For example, all scan in chains may be input through a same pad or pin rather than input through N pads or pins. Also, in alternate embodiments, different circuitry may be provided to implement the functionality of MUXes 30 and 32 and deMUX 28. In yet another embodiment, external scan inputs and outputs (such as external scan out 37 and external scan in 38) may not be provided at all, such that all scan inputs and outputs are provided from and to stop and test circuitry 14.

In operation, when stop and test enable 44 is not asserted, MUXes 30 and 32 select external scan in (1-N) 38 and external scan enable 39, respectively, such that external scan in (1-N) 38 is provided as scan in (1-N) 41 to processor 12 and external scan enable 39 is provided as scan enable 42. Similarly, when stop and test enable 44 is not asserted, deMUX 38 provides scan out (1-N) 40 from processor 12 to external scan out (1-N) 37. In this manner, an external tester may be coupled to the scan input and outputs of processor 12 in order to scan test processor 12. For example, after manufacture of processor 12 or of data processing system 10, processor 12 may be factory tested using a traditional tester coupled to external scan out (1-N) 37, external scan in (1-N) 38 and external scan enable 39. Therefore, traditional scan test methodology may be used to perform this factory testing. However, stop and test circuitry 14 can be used to provide improved testing of processor 12 during actual operation, such as while being used by an end user. Operation of stop and test circuitry 14 will be further described below in reference to FIGS. 2-7. (Note that operation of other portions of data processing system 10 operate as known in the art, and therefore, only those portions of data processing system 10 and processor 12 relevant to understanding the embodiments described herein will be described in more detail.)

Figure 2:
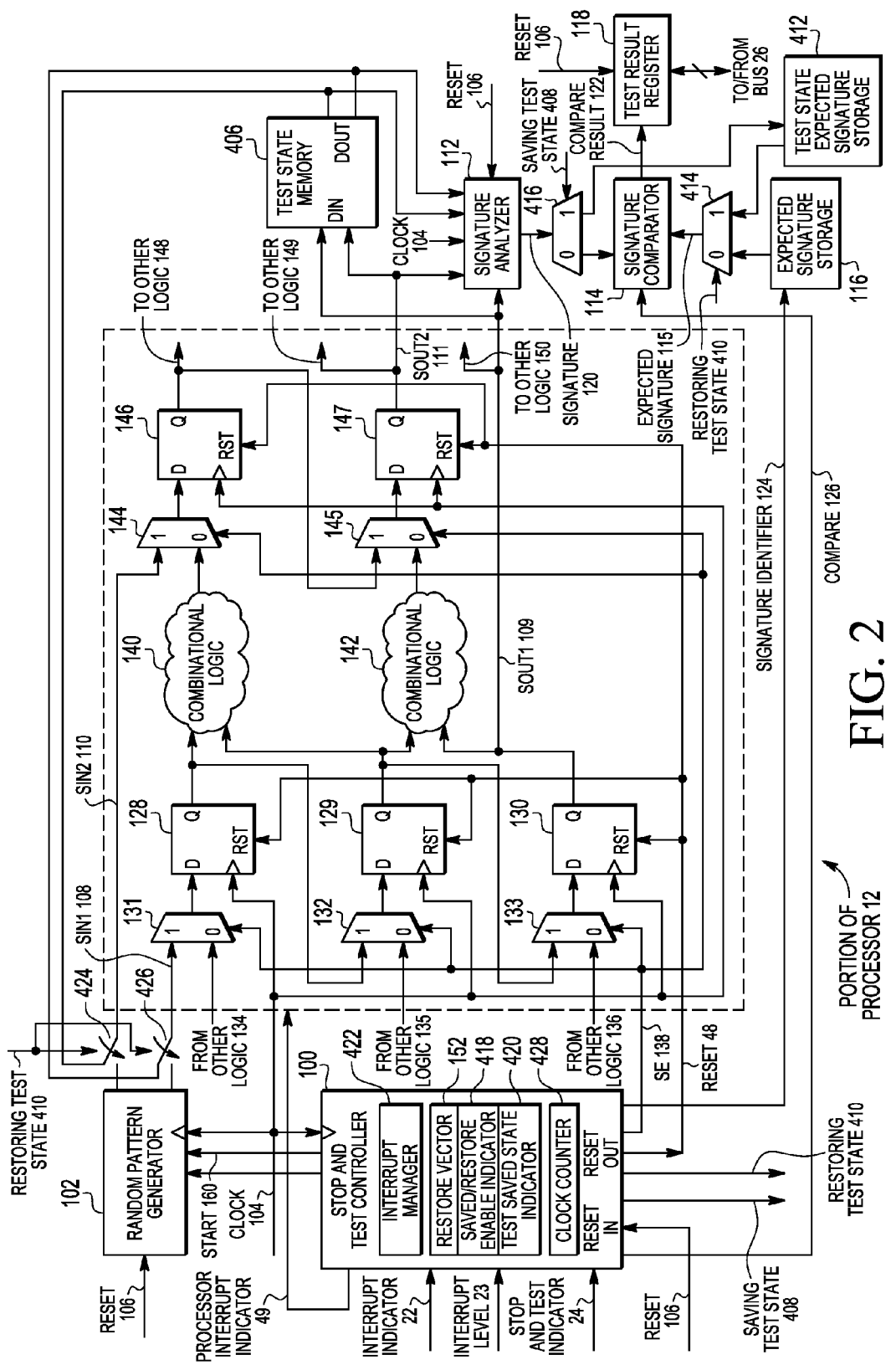
FIG. 2 illustrates, in block diagram form, portions of a processor and stop and test circuitry of FIG. 1, as well as a test state memory, in accordance with one embodiment of the present invention.

FIG. 2 illustrates a portion of processor 12 (within the dotted line), a test state memory 406, and a portion of stop and test circuitry 14 (outside the dotted line, excluding test state memory 406) in accordance with one embodiment of the present invention. In general, the circuitry of processor 12 can be illustrated as a plurality of flip flops or latches which receive inputs from combinational logic or circuitry and provide outputs to combinational logic or circuitry. For example, FIG. 2 illustrates a small portion of the circuitry of processor 12 which includes D flip flops 128-130 and 146-147 and combinational logic 140 and 142. Each of combinational logic 140 and 142 may include any type of combinatorial logic to perform a variety of different functions. For example, each of 140 and 142 may include any number of logic gates (such as, for example, AND gates, OR gates, NOR gates, XOR gates, etc.).

Flip flop 128 and flip flop 129 provide their outputs to combinational logic 140 and combinational logic 140 provides an output to MUX 144, which provides its output to flip flop 146. Similarly, flip flop 129 and flip flop 130 provides their outputs to combinational logic 142 and combinational logic 142 provides an output to MUX 145, which provides its output to flip flop 147. Flip flop 130 also provides its output, Sout1 109, to signature analyzer 112, to test state memory 406, and to other logic 150 (e.g., other combinational logic within processor 12, not illustrated in FIG. 2). MUX 144 also receives Sin2 110 as an input. Each of flip flops 128-130 receive a data input from MUXes 131-133, respectively. MUX 131 receives an input Sin1 108 and another input from other logic 134 (e.g., other combinational logic within processor 12, not illustrated in FIG. 2). Sin1 108 is either provided by random pattern generator 102 or by test state memory 406, based on the state of switch 426, as controlled by a restoring test state signal 410. Similarly, Sin2 110 is either provided by random pattern generator 102 or by test state memory 406, based on the state of switch 424, as controlled by restoring test state signal 410. Note that each of switches 424 and 426, while functioning as a switch, could alternatively be implemented as a MUX. MUX 132 receives the output of flip flop 128 as an input and receives another input from other logic 135 (e.g., other combinational logic within processor 12, not illustrated in FIG. 2). MUX 133 receives the output of flip flop 129 as an input and receives another input from other logic 136 (e.g., other combinational logic within processor 12, not illustrated in FIG. 2). Also, flip flop 146 provides its output to an input of MUX 145 and to other logic 148 (e.g., other combinational logic within processor 12, not illustrated in FIG. 2). Flip flop 147 provides its output Sout2 111 to signature analyzer 112, to test state memory 406, and to other logic 149 (e.g., other combinational logic within processor 12, not illustrated in FIG. 2).

Note that processor 12 may include any type of configuration. For example, the outputs of any of the flip flops may be provided to any number of combinational logic portions, and may even be fed back to a combinational logic portion which provides an input to the same flip flop. Similarly, each flip flop can receive its input from any combinational logic portion. Processor 12 may include any number of flip flops and any amount of combinational logic, as needed, to perform the functions of processor 12. Also, processor 12 can be described as including any number of logic blocks coupled together, where each logic block may include at least one scan chain or portion of a scan chain. Therefore, all of processor 12 or one or more logic blocks of processor 12 can be scan tested.

Outside of the dotted line of FIG. 2 is illustrated test state memory 406 and a portion of stop and test circuitry 14. Stop and test circuitry 14 includes a random pattern generator 102, a stop and test controller 100, signature analyzer 112, signature comparator 114, expected signature storage 116, test state expected signature storage 412, a test result registers 118, a deMUX 416, and a MUX 414. (Note that, in an alternate embodiment, test state memory 406 can be considered as part of stop and test circuitry 14.) Random pattern generator 102 can provide Sin1 108 and Sin2 110 to processor 12 via switches 426 and 424, respectively. Note that Sin1 108 and Sin2 110 can be two of the scan in (1-N) 41 inputs to processor 12 illustrated in FIG. 1 which are received from stop and test circuitry 14 via MUXes 30 when stop and test enable 44 is asserted. Sout1 109 and Sout2 111 are provided to signature analyzer 112. Note that Sout1 109 and Sout2 111 can be two of the scan out (1-N) 40 outputs from processor 12 illustrated in FIG. 1 which are provided from processor 12 to stop and test circuitry 14 via deMUX 28 when stop and test enable 44 is asserted. Also, stop and test controller 100 provides scan enable (SE) 138 to all of MUXes 131-133, 144, and 145. Note that SE 138 can be scan enable 42 to processor 12 illustrated in FIG. 1 which is received from stop and test circuitry 14 via MUX 32 when stop and test enable 44 is asserted.

Note that in FIG. 2, the outputs and inputs between stop and test circuitry 14 and processor 12 are illustrated as direct connections without MUXes 28, 30, and 32 so as not to overcomplicate FIG. 2. Also, if external scan connections are not required for processor 12, then data processing system 10 may also not include MUXes 28, 30, and 32, and the inputs and outputs between stop and test circuitry 14 and processor 12 would be directly connected, as illustrated in FIG. 2.

Still referring to FIG. 2, stop and test controller 100 receives a reset 106 and provides a reset 48 to all of flip flops 128-130, 146, and 147. In one embodiment, reset 106 is a signal received via bus 26. Reset 106 is also provided to signature analyzer 112, random pattern generator 102, and test result register 118. Stop and test controller 100 also includes restore vector 152, a save/restore enable indicator 418, and a saved test state indicator 420. These may be registers or other storage circuitry located in stop and test controller 100 (or may even be located elsewhere within stop and test circuitry 14 or data processing system 10). Stop and test controller 100 also includes an interrupt manager 422 and a clock counter 428. Stop and test controller 100 receives interrupt indicator 22 and a corresponding interrupt level 23 of interrupt indicator 22 from interrupt controller 20, provides start 160 to random pattern generator 102, provides signature identifier 124 to expected signature storage 116, provides compare 126 to signature comparator 114, provides processor interrupt indicator 49 to processor 12, and provides saving test state signal 408 to deMUX 416, and provides restoring test state signal 410 to MUX 414 and to control inputs of switches 424 and 426.

Signature analyzer 112 receives Sout1 109, Sout2 111, as well as data outputs from test state memory 406. Signature analyzer 112 provides a signature 120 to a data input of deMUX 416 which has a first data output coupled to provide signature 120 to signature comparator 114 and has a second data output coupled to provide signature 120 to test state expected signature storage 412. A control input of deMUX 414 is coupled to receive saving test state signal 408. Signature comparator 114 receives an expected signature 115 from a data output of MUX 414, where a first data input of MUX 414 is coupled to receive an expected signature from expected signature storage 116 and a second data input of MUX 414 is coupled to receive an expected signature from test state expected signature storage 412. A control input of MUX 414 is coupled to receive restoring test state signal 410. Signature comparator 114 compares signature 120 with expected signature 115 and provides a compare result 122 to test result register 118. Test result register 118 may also be bidirectionally coupled to bus 26. Note that test result register 118, expected signature storage 116, and test state expected signature storage 412 may each be implemented as registers or may be implemented as any other storage circuitry. For example, they may be located in memory within data processing system 10. Also, test result register 118, expected signature storage 116, and test state expected signature storage 412 may be located anywhere within data processing system 10.

A clock 104, which may be generated as known in the art, is provided to random pattern generator 102, stop and test controller 100, signature analyzer 112, and processor 12 (e.g. to each of flip flops 128-130, 146, and 147). As will be described below, clock counter 428 can count test clock cycles of clock 104. Clock 104 may represent the only clock within data processing system 10, or may represent one clock domain of data processing system 10 or processor 12. In this case, other portions of processor 12 may, for example, be located within a different clock domain and therefore receive a different clock (different from clock 104). Each of the clock domain clocks may be generated from a same system clock or may be separately generated. These clocks, regardless of the configuration, may be generated and provided as known in the art.

In operation, note that MUXes 131-133, 144, and 145 allow for the scan testing of processor 12. These MUXes are used to create various scan chains (two of which are illustrated in FIG. 2, one having input Sin1 108 and output Sout1 109 and another having input Sin2 110 and Sout2 111). For example, one scan chain includes flip flops 128-130, where, when SE 138 is asserted, scan chain input Sin1 108 is provided as input to flip flop 128, the output of flip flop 128 is provided as input to flip flop 129, the output of flip flop 129 is provided as input to flip flop 130, and the output of flip flop 130 provides the scan chain output Sout1 109. Similarly, another scan chain of processor 12 includes flip flops 146 and 147, where, when SE 138 is asserted, scan chain input Sin2 110 is provided as input to flip flop 146, the output of flip flop 146 is provided as input to flip flop 147, and the output of flip flop 147 provides the scan chain output Sout2 111. Therefore, when SE 138 is asserted, scan inputs and outputs may be shifted in and out, respectively, in order to test all or portions of processor 12.

When SE 138 is not asserted, note that processor 12 operates normally, where the inputs flip flops 128-130, 146, and 147 are provided by combinational logic of processor 12, and the output are provided to combinational logic of processor 12. That is, during normal operation with SE 138 not asserted, the inputs and outputs of the flip flops are not chained, thus not forming the scan chains described above.

Note that in the illustrated embodiment, a mux-D scan chain configuration is illustrated where MUXes are used at the inputs of each of the D flip flops so that the D flip flops may be configured for normal operation and be configured as scan chains for testing. However, note that other scan chain configurations and other memory elements may be used. For example, a Level-Sensitive Scan Design (LSSD) configuration, as known in the art, may be used. Note also that the scan chain configuration of processor 12 may vary. For example, processor 12 may include a single scan chain or any number of scan chains. Also, a single or any number of scan chains may exist for each clock domain, as was described above. Also, each scan chain can be of any arbitrary length (thus including any arbitrary number of flip flops or other memory elements). In addition, in some embodiments, the scan chain organization may be configurable, such that scan chain connections may be modified to allow for changing the number and/or length of the scan chains within a portion of processor 12. This configuration may be accomplished by modifying the inputs to and controls of MUXes 131, 132, 133, 144, and 145 to effect an alternate interconnection of the output of the flip flops of processor 12. This control may be supplied by stop and test controller 100, or may be provided from elsewhere within data processing system 10.

Note that the flip flops of processor 12, during normal operation when SE 138 is negated, store the current application state of the processor. Note that the current state of the processor during normal operation when a user application is being executed can be referred to as the application state of the processor. With each clock pulse, the values of the flip flops are updated accordingly, based on the values which propagate through the combinational logic from one flip flop to another. For example, during normal operation when SE 138 is negated, the outputs of flip flops 128 and 129 propagate through combinational logic 140 to produce an input to MUX 144. Upon clock 104 clocking flip flop 146, this output of combinational logic 140 is stored into flip flop 146 via MUX 144 (since the select signal for MUX 144, SE 138, is negated). When shifting during scan testing is performed (where SE 138 is asserted), the flip flops form scan chains (as was described above), where a number of scan chain inputs (i.e. test stimulus or test inputs) are shifted in. Once a number of inputs has been shifted in, SE 138 is negated, such that the next clock produces a functional cycle (or in some embodiments, more than one cycle) during testing where the test results, resulting from the shifted-in test inputs propagating through the combinational logic, are captured in the scan chains. SE 138 is then again asserted such that the captured output is then shifted out. In this manner, inputs (test stimulus) are provided to processor 12 with SE 138 asserted, a clock is then provided with SE 138 negated so as to provide a functional cycle, and the outputs are then read out of processor 12 with SE 138 again asserted. Note that the current state of the processor during any of this testing procedure (when test stimulus is being provided to processor 12 with SE 138 asserted, the functional cycle with SE 138 negated, or reading out the outputs with SE 138 asserted), may be referred to as the test state of processor 12. Therefore, note that the application state of processor 12 and the test state are generally mutually exclusive. Furthermore, the test state may further include the state of stop and test circuitry 14 in addition to the state of processor 12 during the testing procedure.

In one embodiment, note that as the number of inputs are shifted in with SE 138 asserted, the same number of outputs are being shifted out. That is, each time a test input is shifted in, a test output is simultaneously shifted out. Also, any number of test inputs and outputs may be shifted in and out, respectively, before negating SE 138 to allow for a functional cycle. This number may be any integer greater than or equal to 1. For example, in one embodiment, after one input is shifted in (while one output is shifted out), SE 138 is negated such that a functional cycle occurs with the next clock. In an alternate embodiment, five inputs may be shifted in (while five outputs are shifted out) before negating SE 138 to allow for a functional cycle. Therefore, during scan testing, clock 104 may be described as allowing for test input/output shifting cycles where inputs and outputs are shifted into and out of the scan chains with SE 138 asserted and as allowing for functional cycles where SE 138 is negated such that the test results, resulting from the shifted-in test stimulus propagating through the combinational logic, are captured. In one embodiment, the clock cycles during test (including both shifting and functional clock cycles) may be referred to as test clock cycles.

For example, referring to FIG. 2, for scan testing, SE 138 is asserted and a particular number of test inputs are scanned into the scan chains. That is, a particular number of clock cycles of clock 104 are used to input test inputs into each chain. For example, in a first test input/output shift cycle of clock 104, a test stimulus is shifted into each of flip flops 128 and 146 via Sin1 108 and Sin2 110, respectively. During this first test input/output shift cycle of clock 104, values are also be shifted out from flip flops 130 and 147 via Sout1 109 and Sout2 111, respectively. During the next test input/output shift cycle of clock 104, the values that were in flip flops 128 and 146 are shifted into flip flops 129 and 147, respectively, and the value in flip flop 129 is shifted into flip flop 130. The values of flip flops 130 and 147 are output as Sout1 109 and Sout2 111, respectively. Any number of these test input/output shift cycles may occur, as desired. After the desired number of test input/output shift cycles, a functional cycle is performed by negating SE 138. In this functional cycle, the values which propagate from other logic 134, from other logic 135, from other logic 136, from combinational logic 140, and from combinational logic 142 are captured into flip flops 128-130, 146, and 147, respectively, with clock 104. During the next test input/output shift cycles, these captured values are shifted out (as new inputs are being shifted in). Note that any number of functional cycles may be performed prior to the next test input/output shift cycles.

Note that typically, prior to starting scan testing, the flip flops are reset to a known value, such as, for example, logic level zero. Also note that prior to starting scan testing, the flip flops may be configured into one of several alternatives for defining the number of scan chains and the scan chain lengths. The configuration control may be supplied from stop and test controller 100 of FIG. 2, or from elsewhere within data processing system 10. Also, in one embodiment as will be described below, the flip flops (as well as circuitry within stop and test circuitry 14) are restored to a previously stored test state to continue testing from a previous point in time.

Based on the test inputs shifted in, particular results are expected. Therefore, the output values that are shifted out of the scan chains can be provided to a signature analyzer to create a signature which is then compared to an expected signature corresponding to the shifted-in test inputs. If they do not match, a failure is indicated. Note that in one embodiment, predetermined vectors of inputs may be shifted in where each of these predetermined vectors has a corresponding expected signature. Alternatively, LBIST may be used where a pseudo random number generator may be used to produce pseudo random vectors (test inputs), i.e. effectively random rather than predetermined, but reproducible as specified by a seed value. These vectors also have associated expected signatures which can be used to determine pass or failure of the test.

Note that scan testing is a good way of providing the overall health of a system. That is, it may be used to easily test all, a majority, or simply a large portion of the device being tested (i.e. a device under test, or DUT, which is processor 12 in the example of FIG. 2). However, since scan testing requires the use of the same flip flops which store states of the DUT, it is very intrusive, in that the current application state of the DUT is lost upon scan testing. Also, LBIST is a convenient way to test the overall health of a DUT through the use of pseudo random patterns in scan testing. LBIST provides scan stimulus based off of pseudo-random numbers to the DUT. The fault coverage obtained through the usage of previously mentioned scan stimulus can be represented by a non-linear coverage graph, where, for example, the increase in test coverage begins to rapidly drop off after a certain number of clocks. The actual coverage obtained is determined by the tool that was used during the LBIST generation and the pass/fail status is determined by comparing the actual versus expected signatures. There are typically two ways to obtain higher fault coverage: by inserting controllability and/or observability points into the design or repeating the sequence longer. Therefore, LBIST and scan testing is typically done at the factory, prior to shipping devices to end users (thus prior to normal operation by an end user), where it is irrelevant whether the testing is intrusive.

As will be described below, this type of intrusive testing can be performed during normal operation. That is, software may be written which allows processor 12 to be scan tested during normal operation, such as when in use by an end user. For example, in one embodiment, a software instruction, such as a stop and test instruction, may be used in a user application to initiate the scan testing of processor 12. Alternatively, a software instruction may result in some action which causes the scan testing of processor 12. For example, an instruction which writes a bit to a particular register or address location may initiate scan testing of processor 12. In this manner, note that software executing on processor 12 can result in the generation of a stop and test indicator which initiates scan testing of processor 12 itself. Therefore, an overall confidence level of all or most of processor 12 can be achieved through software control during normal operation without the need for writing complex software test functions. As described above, these software test functions only tested portions of processor 12 with software, and provided only limited coverage, unlike scan testing.

Furthermore, as will be described below, a save/restore mode may be used which allows for a test state to be saved and restored upon a subsequent indication of a stop and test procedure. In this manner, by being able to continue a test which was started in response to a previous stop and test procedure, a larger amount of information may be accumulated over time. Since the confidence level of testing increases with the number of clock cycles of testing, this may further improve the overall confidence level of the testing. In one embodiment, a test state memory is used to save and restore the test state, such as test state memory 406 of FIG. 2. Test state memory 406 may be any memory within data processing system 10, such as memory 18 or any RAM within other modules 16. Alternatively, test state memory 406 may be implemented using cache 13 or a portion of cache 13 within processor 12. Furthermore, as will be described below, interrupts to processor 12 from interrupt controller 20 may be filtered by stop and test circuitry 14 in order to balance a desired scan testing confidence level against a performance level of data processing system 10. For example, the providing of interrupts from interrupt controller 20 to processor 12 for servicing during a stop and test procedure may be controlled by stop and test circuitry 14, in which stop and test circuitry 14 may mask or delay particular interrupts. In one embodiment, the interrupts received during a stop and test procedure may be masked or delayed based on a progress status of the testing. In this manner, by masking or delaying the servicing of interrupts based on the progress status of testing, an increased confidence level may be achievable by trading off the performance levels of processor 12.

Figure 5:
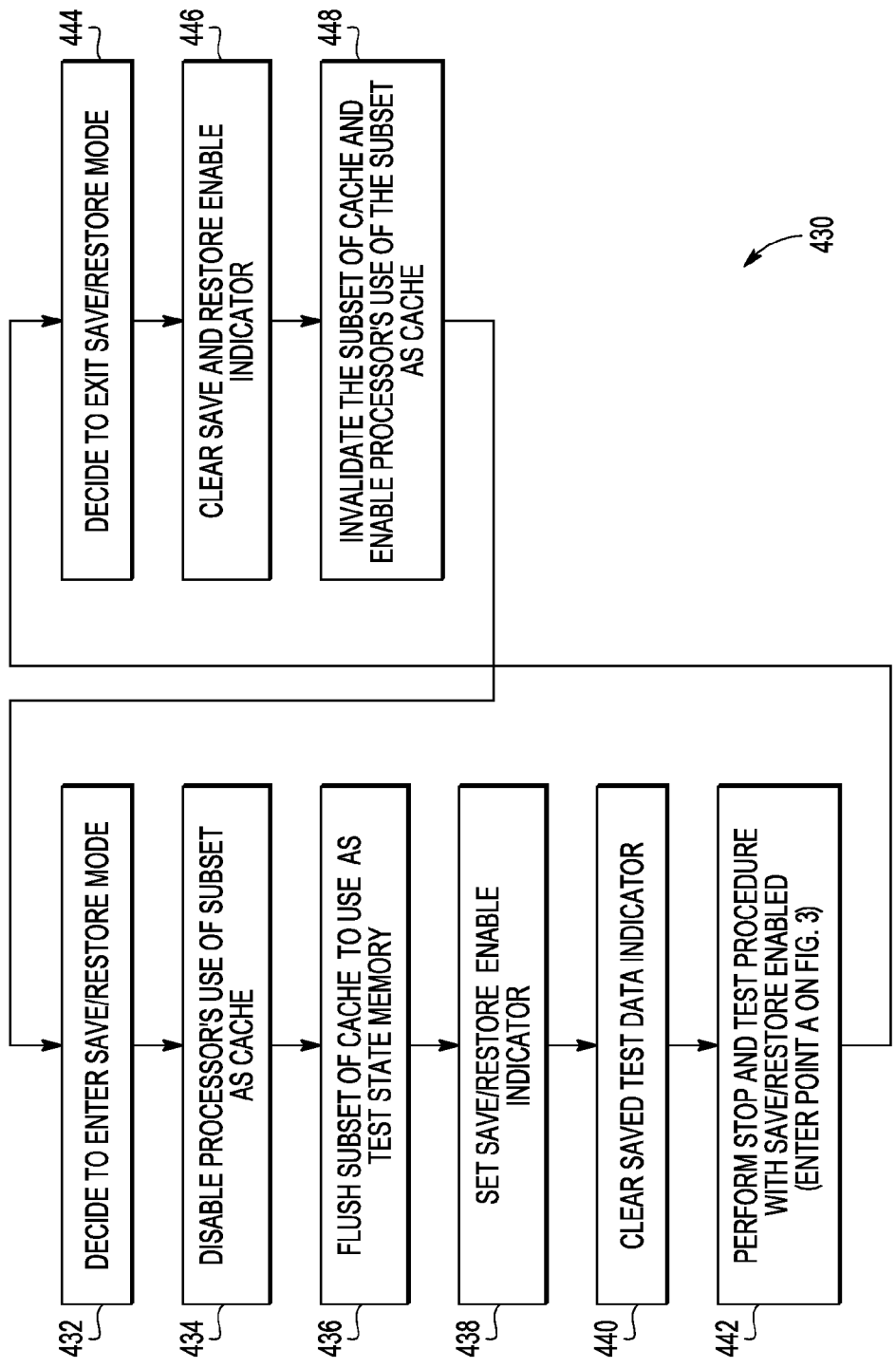
FIG. 5 illustrates, in flow diagram form, a method of enabling and disabling a save/restore mode of the data processing system of FIG. 1, in accordance with one embodiment of the present invention.

FIG. 5 illustrates, in flow diagram form, a method 430 of enabling and disabling a save/restore mode of data processing system 10 in which test state can be saved and restored between different stop and test procedures executed in response to successive stop and test instructions. Furthermore, in the embodiment of the description of FIG. 5, it is assumed that test state memory 406 used for saving the test state and for restoring the test state corresponds to cache 13 of processor 12. That is, in the embodiment of FIG. 5, it is assumed that a portion of cache 13 is used as test state memory 406. For example, in one embodiment, such as in the case where cache 13 is a set-associative multi-way cache, one or more ways can be set aside as a subset of the cache for use as test state memory 406. Alternatively, other subsets of cache 13 may be defined for use as test state memory 406, or other memories in data processing system 10 may be used instead. Referring to block 432 of FIG. 5, a decision to enter save/restore mode can be made. For example, this decision can be made by the application software running on processor 12. Therefore, a user of processor 12 can write software which can selectively enable or disable the save/restore mode for testing. Upon a decision being made to enter save/restore mode, the application software running on processor 12 prepares processor 12 and stop and test circuitry 14, as needed, to enter save/restore mode. For example, referring to FIG. 5, after making a decision to enter save/restore mode, flow proceeds to block 434 in which the processor's use of this subset of cache 13 is disabled. That is, when save/restore mode is enabled, note that the subset of cache 13 that is defined for use as test state memory 406 can no longer be used as normal cache memory by processor 12. That is, the allocation logic of cache 13 cannot select any portion within this subset of cache 13 for allocation of a new cache line during normal operation.

Flow then proceeds to block 436 in which the selected subset of cache 13 which is to be used as test state memory 406 is flushed. That is, any data within this subset of cache 13 which needs to be written to memory to maintain coherency is written to memory. In one embodiment, the flushed cache lines are also marked as invalid. After the subset of cache 13 which is to be used as test state memory 406 is disabled and flushed, flow proceeds to block 438 in which save/restore enable indicator 418 within stop and test controller 100 is set to indicate that the save/restore mode is enabled. Flow then proceeds to block 440 in which saved test data indicator 420 is cleared to indicated that no test data is currently saved in test state memory 406 (i.e. within the selected subset of cache 13). Flow then proceeds to block 442 in which one or more stop and test procedures are performed with save/restore mode enabled. For example, this may correspond to entering the flow of FIG. 3 at point A, as will be described in more detail below. Also, use of saved test data indicator 420 will be further described below in references to FIGS. 3 and 4. For example, the first time test data is stored to test state memory 406, saved test data indicator 420 may be set (e.g. to a logic level one) to indicate that there is saved test data available for restoring.

At some point, flow may proceed to block 444 if the application software decides to exit or disable the save/restore mode. This could be done, for example, to increase performance of data processing system 10, once the scan testing confidence level has been deemed sufficiently high. Flow then proceeds to block 446 in which save/restore enable indicator 418 is cleared to indicate that the save/restore mode is no longer enabled. Flow then proceeds to block 448 in which the subset of cache 13 which was being used as test state memory 406 is invalidated and the processor's use of this subset of cache 13 is enabled. That is, this subset of cache 13 that was used as test state memory 406 can again by used as normal cache memory by processor 12 (and again be selected for allocation). Flow may then return to block 432 if the application software decides to re-enter the save/restore mode.

Note that each time save/restore mode is enabled, either the same subset of cache 13 may be used as test state memory 406 or different subsets of cache 13 may be used as test state memory 406. Also, in an alternate embodiment, the subset of cache 13 defined for use as test state memory 406 may be flushed or invalidated as needed within block 442. That is, for example, when there is test data to be stored into test state memory 406 (such as after a check point has been reached, as will be described below), then at that time, the subset of cache 13 may be flushed and invalidated (or simply invalidated if already previously flushed in block 436). In this manner, by not flushing in block 436 but waiting to flush or invalidate as needed in block 442, if an interrupt is received early on in block 442 (such as prior to reaching a next check point), the cache line data within the subset of cache 13 is not lost since it has not yet been invalidated or flushed. Also, in this manner, the time needed to flush the subset of the cache may be incurred only as needed within block 442 as opposed to up front in block 436. Note also that, in some embodiments, the clearing of saved test data indicator 420 may be done automatically by stop and test circuitry 14 as part of entering block 442, rather than by application software, to prevent mis-synchronization between stop and test circuitry 14 and application software.

Figure 6:
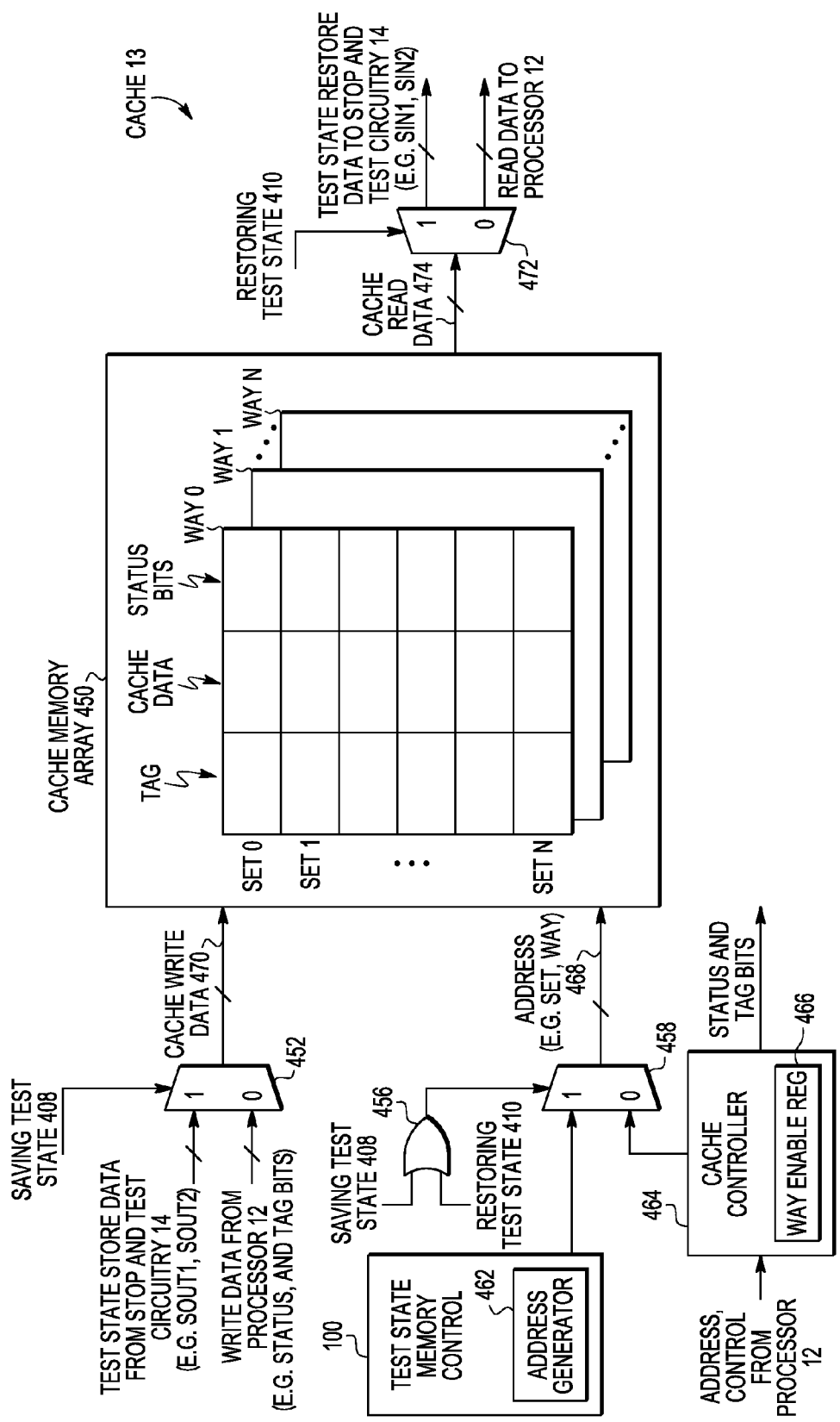
FIG. 6 illustrates, in block diagram form, the cache of the processor of FIG. 1 which is useable as the test state memory of the data processing system of FIG. 1, in accordance with one embodiment of the present invention.

FIG. 6 illustrates one embodiment of cache 13 of processor 12, in accordance with one embodiment of the present invention. As described in reference to FIG. 5, a portion of cache 13 may be used to implement test state memory 406. Cache 13 includes a cache memory array 450, test state memory control 460, a cache controller 464, MUXes 452 and 458, and deMUX 472, and OR gate 456. Cache array 450 includes "N+1" sets (sets 0 to N) and "M+1" ways (ways 0 to M), and may be referred to as a multi-way set-associative cache. Therefore, cache 13 can be described as having N+1 sets, each having M+1 ways. A cache line refers to an intersection of a cache way and a set. For example, way 0 includes N+1 cache lines, each corresponding to one of set 0 to set N. Alternatively, other types of caches, other than a multi-way set associative cache, may be used.

As illustrated in FIG. 6, cache array 450 includes storage circuitry which stores information in each of a plurality of cache lines. For example, cache array 450 includes tag, cache data, and status bits for each cache line. Cache array 450 receives cache write data 470 and physical address information 468 from MUX 452 and 458, respectively, and provides cache read data 474 to deMUX 474. Physical address information 468, during a normal cache write operation, may include the set and way corresponding to a cache line selected for a write operation. MUX 458 has a first data input coupled to an output of test state memory control 460 and a second data input coupled to cache controller 464. A control input of MUX 458 is coupled to an output of OR gate 456 which receives saving test state signal 408 at a first input and restoring test state signal 410 at a second input. Therefore, when test state is being saved or restored, physical address information 468 is generated by test state memory control 460; however, when the test state is not being either saved or restored, cache controller 464 generates address information 468. MUX 452 receives test state store data from stop and test circuitry 14, such as, for example, Sout1 109 and Sout2 111 at a first data input, and receives write data from processor 12 at a second data input. A control input of MUX 452 receives saving test state signal 408. Therefore, when test state is being saved, cache write data 470 is generated by stop and test circuitry 14 (such as Sout1 and Sout2); however, when test state is not being saved and a normal cache write is being performed, cache write data 470 is provided by processor 12 and may include, for example, the appropriate tag and status bits for storage into the selected cache line. A first data output of deMUX 472 provides test state restore data to stop and test circuitry 14, such as, for example, Sin1 108 and Sin2 110, and a second data output of deMUX 472 provides read data to processor 12. A control input of deMUX 472 receives restoring test state signal 410. Therefore, when test state is being restored, cache read data 474 is provided as test state restore data to stop and test circuitry 14 (such as Sin1 and Sin2); however, when test state is not being restored and a normal cache read is being performed, the selected cache line is provided as cache read data 474 as read data to processor 12.

During normal operation in which processor 12 is accessing cache 13 as a normal cache, cache controller 464 controls cache 13 and provides address information 468 to cache array 450. For a normal cache write, cache write data is provided from processor 12 for storage into the selected cache line and for a normal cache read, cache read data is provided to processor 12 from the selected cache line. For a normal cache write, allocation logic within cache controller 464 may select a cache line as the selected cache line according to any known allocation policy. As discussed above in reference to FIG. 5, in one embodiment, one or more ways of cache array 450 may be used as test state memory 406 if the save/restore mode is enabled. In this case, these one or more ways are disabled for use as a normal cache by processor 12. Alternatively, a portion of the cache 13 could be set apart for test state memory 406 in other ways, such as by using one or more sets of the cache, or by reducing the line size. Therefore, in one embodiment, as illustrated in FIG. 6, cache controller 464 include a way enable register 466 which stores an indication as to whether each way is enabled or disabled for use as normal cache storage for processor 12. For example, way enable register 466 may include a single bit for each way of cache array 450 indicating whether the corresponding way is enabled or disabled for use as a normal cache by processor 12. Therefore, in one embodiment, in response to the save/restore mode being enabled or disabled, the corresponding bit or indicator in way enable register 466 can be enabled or disabled, accordingly. Also, the allocation logic within cache controller 464 which selects a next cache line (i.e. allocates a next cache line) for a cache update can use way enable register 466 to know which ways are available for selection. Any allocation policy can therefore be modified such that it selects a cache line for replacement based on only those ways which are available for use.

Although memories other than cache 13 of processor 12 can be used as test state memory, in one embodiment, cache 13 is a fast memory which may be advantageous because, during scan operation, flip flops 128, 129, 130, and 146 and 147 can only operate in either of two ways: they can either shift when SE 138 is high, or they can operate normally when SE 138 is low. Therefore, they have no way of holding their current state, other than by gating the clock to them. This means that, once the process of saving or restoring test state begins, it cannot be paused, thereby making a fast test state memory (such as cache 13) advantageous.

When save/restore mode is disabled, or, for those ways which are available for use as normal cache storage for processor 12 when save/restore mode is enabled, cache 450 and cache controller 464 operate as known in the art. That is, for a normal cache write, a cache line is selected for update according to an allocation policy, as described above. The new data to be written to the selected cache line (including the status and tag bits) is then received via MUX 452. For a normal cache read, address and control information can be received by cache controller 464 from processor 12. Cache controller 464 then determines if the received address results in a hit in cache array 450, as known in the art, and in response to a hit being determined, cache controller 464 can use the received address to generate the appropriate address information (e.g. the set and way corresponding to the accessed cache line) to provide to cache array 450. The data from the cache line which resulted in the hit can then be provided, via deMUX 472, as read data to processor 12 in response to the cache hit.

However, when save/restore mode is enabled and either a save or a restore of the test state is being performed, addressing of cache array 450 is controlled by test state memory control 460 rather than cache controller 464. In the illustrated embodiment, test state memory control 460 includes an address generator 462. Also, note that when a save of the test state is being performed, saving test state signal 408 is asserted (e.g. is set to a logic level one) to indicate that the save is occurring and when a restore of the test state is being performed, restoring test state signal 410 is asserted (e.g. is set to a logic level one) to indicate that the restore is occurring. In one embodiment, when either saving test state 408 or restoring test state 410 is asserted, address generator 462 provides physical address information 468 via MUX 458 to cache array 450. In one embodiment, circuitry within test state memory control 460 includes an indication as to which ways or section of cache array 450 is to be used as test state memory 406. In this manner, address generator 462 knows which range of addresses it may use for storing test state store data.

Therefore, in the case of storing test state in which saving test state signal 408 is asserted, test state store data (i.e. test data) is received from stop and test circuitry 14, including, for example, the current value of random pattern generator 302 (e.g. the seed of random pattern generator 302), the current value of signature analyzer 112, the current contents of test result register 118, and the contents of the scan chains, and any other information for storing the current test state (e.g. the current value of clock counter 428). This test state store data is provided to cache array 450 via MUX 452 and is stored at a address of cache array 450 generated by address generator 462. In one embodiment, every portion of the selected way or ways for use as test state memory 406 is used to store test state store data, including, for example, the tag portion, cache data portion, and status bits portion. Alternatively, only a subset of the selected ways may be used, such as the tag portion and cache data portion, but not the status bits portion.

In the case of restoring test state in which restoring test state signal 410 is asserted, test state restore data (i.e. test data) is provided from cache array 450 to stop and test circuitry 14 and may include, for example, the values to which to restore the contents of random pattern generator 302 (e.g. the seed of random pattern generator 302), signature analyzer 112, test result register 118, scan chains, and any other information which was part of the restored test state (such as the value of clock counter 428). This test state restore data is provided from the physical address of cache array 450 generated by test state memory control 460 which knows where in cache array 450 the test state to be restored is currently stored.

Figure 3:
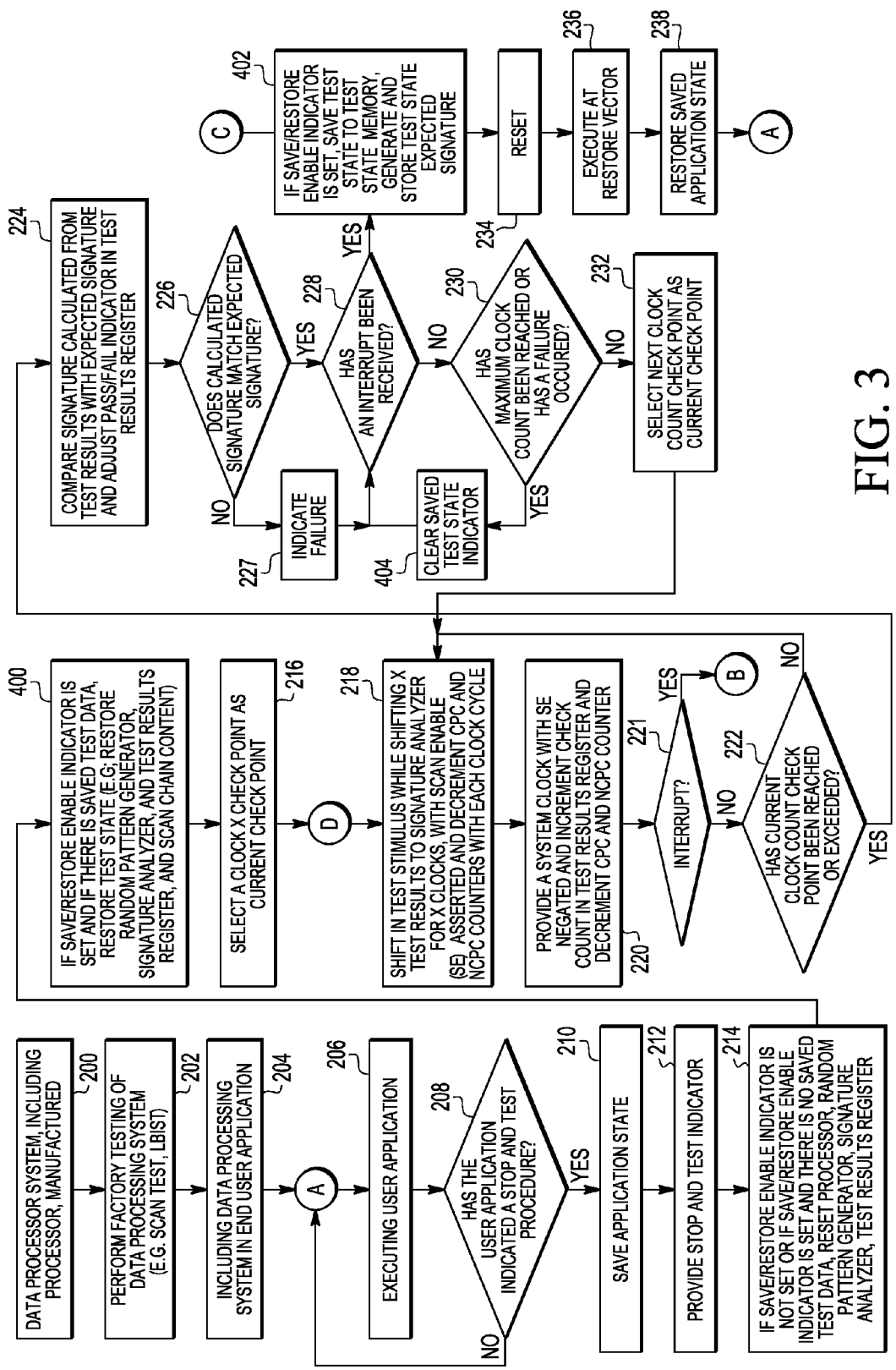
FIGS. 3 and 4 illustrate, in flow diagram form, a method of testing the processor of FIG. 1, in accordance with one embodiment of the present invention.
Figure 4:
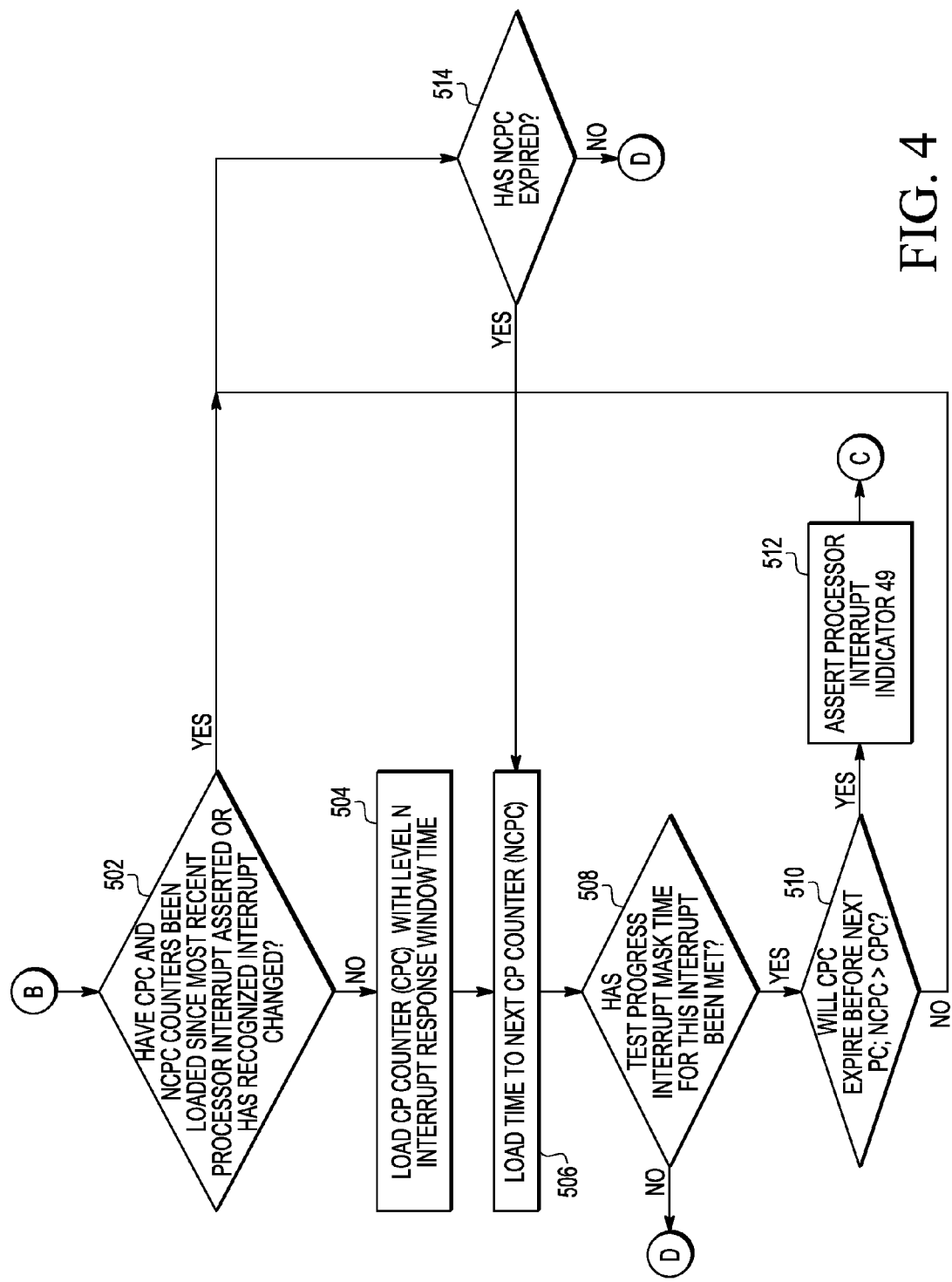

FIGS. 3 and 4 illustrate, in flow diagram form, a method of testing processor 12 of FIG. 1, in accordance with one embodiment of the present invention. Note that the descriptions of FIGS. 3 and 4 will be provided with respect to processor 12 being the device under test (DUT). However, the descriptions herein also apply to the DUT being any portion of processor 12 (such as one or more logic blocks of processor 12). Also, the descriptions of FIGS. 3 and 4 will be provided with respect to test state memory 406 being cache 13 or a portion of cache 13, as was described above in reference to FIGS. 5 and 6.

Referring to FIG. 3, flow begins with block 200 where data processing system 10, including processor 12, is manufactured. Flow proceeds to block 202 where factory testing of data processing system 10 is performed. This factory testing may include, for example, scan testing, LBIST, or any other type of testing, and is typically performed prior to providing the system to any end user. This factory testing may be intrusive (i.e. may scramble the state of the device), since the device is not yet being used in an end user application. Furthermore, more time is typically available for this factory testing. Also, the timing of this factory testing does not need to be controlled by the end user application.

Flow then proceeds to block 204 where data processing system 10 may be included in an end user application. For example, data processing system 10 may be included into an automobile, hand held device, etc. In one embodiment, the factory testing described in block 202 may be performed only on processor 12. In this case, processor 12, in block 204, may then be included into a data processing system such as data processing system 10 and may then also be included into an end user application. In one embodiment, data processing system 10 may itself be an end user application.

Flow proceeds from block 204, via point A, to block 206 where a user application is executed. For example, once processor 12 is in an end user application, such as an automobile, user applications are executed on processor 12. At this point, the data processing system 10 is out of the factory and in the hands of an end user. Flow then proceeds to decision diamond 208 where it is determined whether the user application has indicated a stop and test procedure. As was discussed above, this may be done by the user application in a variety of ways. In one embodiment, a stop and test software instruction within the user application may have been decoded to indicate a stop and test procedure. Alternatively, a software instruction within the user application which writes to a particular register or memory location may have been detected by circuitry within processor 12, indicating a stop and test procedure. In either case, when a stop and test procedure is indicated within processor 12, stop and test indicator 24 is provided from processor 12 to stop and test circuitry 14. In the former embodiment of the stop and test software instruction, the instruction decoder of processor 12 may provide stop and test indicator 24, and in the latter embodiment of writing to a particular location, circuitry which polls the particular location or otherwise detects the write may provide stop and test indicator 24.

Referring back to FIG. 3, if the user application has not indicated a stop and test procedure, flow returns to point A where user applications continue to execute. If a stop and test procedure is indicated, flow proceeds to block 210 where execution of the user application is stopped and the application state of processor 12 is saved. This application state corresponds to the current state of processor 12 resulting from executing the user application. If necessary, the values within all or a portion of the flip flops in processor 12 may be saved so as to be able to continue executing the user application from a same point after the stop and test procedure. In an alternate embodiment, only some of the flip flops may need to be saved, thus saving time and resources. In this alternate embodiment, software may be used to indicate which portions of processor 12 are to be saved. Also, if the saving of application state is required, additional software instructions may be provided in the user application to indicate which flip flops are to be saved and where, or an additional software instruction may be provided which indicates that all flip flops are to be saved. Alternatively, upon indication of a stop and test procedure, specialized hardware circuitry may be used to perform a faster save of the current application state of all or a portion of the flip flops.

After the application state is optionally saved, flow proceeds to block 212 where stop and test indicator 24 is provided to, for example, stop and test circuitry 14. Flow proceeds to block 214 where a reset is performed if save/restore enable indicator 418 is not set (e.g. is a logic level zero) or if both (1) save/restore enable indicator 418 is set (e.g. a logic level one) and (2) there is no saved test data (as indicated, for example, by saved test state indicator 420 being a logic level zero). For example, if a reset is to be performed, stop and test circuitry 14 provides reset 48 to the flip flops of processor 12 and to any other circuitry that needs to be reset within data processing system 10, such as, for example, random pattern generator 102, signature analyzer 112, and test results register 118. This ensures, for example, that the stop and test procedure begins with known values. In one embodiment, the reset (such as reset 48) does not reset everything, where, for example, software may be used to initialize registers. In alternate embodiments, the effect of the reset can be achieved in other ways, such as by scanning in a reset state.

Flow then proceeds to block 400 in which a restore of the test state (i.e. a restore of the test data) is performed if both (1) save/restore enable indicator 418 is set (e.g. a logic level one) and (2) there is saved test data (e.g. if saved test state indicator 420 is a logic level one). For example, when restoring the test state, the contents of random pattern generator 102, signature analyzer 112, test result register 118, and the scan chains of processor 12 can all be restored. Additional portions of the test state may also be restored, such as the contents of clock counter 428, as needed (assuming they were previously stored). In one embodiment, these values are read from cache 13, which is being used as test state memory 406. As described above in reference to FIGS. 5 and 6, test state memory control 460 can appropriately generate the physical addresses of cache array 450 to read out the stored test data in order to properly restore the test state. For example, cache array 450 may provide the contents of the scan chain serially to Sin1 108 and Sin2 110 via switches 424 and 426, as controlled by restoring test state signal 40 (which, during a restore, would be set to a logic level one, thus allowing Sin1 108 and Sin2 110 to be provided by test state memory 406 rather than random pattern generator 102). Therefore, in blocks 214 and 400, the test state circuitry can either be reset or restored, as needed.

Flow then proceeds to block 216 where a clock count check point is selected as a current check point. That is, since the testing is being performed during normal operation, such as during the execution of a user application, time may not allow for full testing each time a stop and test procedure is indicated. Therefore, test results may only need to be compared and analyzed if a particular number of clocks has been reached first. For example, the following is a sample table which relates the number of clocks to fault coverage of the DUT provided by LBIST. (The following table is only being provided as an example, where the actual values would be design-sensitive.)

| Number of Clocks | Coverage |
| --- | --- |
| 20 | 5% |
| 100 | 10% |
| 500 | 30% |
| 2000 | 70% |

Therefore, if 500 clocks can be provided, then a coverage of 30% is achieved, etc. Therefore, in one embodiment, test results are only updated upon reaching particular clock check points. In one embodiment, the clock check points are set up according to the desired coverage levels, for example, at 5%, 10%, 30% etc., where the test results are updated after 20 clocks (corresponding to 5%), after 100 clocks (corresponding to 10%), after 500 clocks (corresponding to 30%), etc. Also, in the current embodiment, the number of clocks in the above table refers to functional clock cycles occurring during the testing (as was described above) where clocks provided for test input/output shift cycles are not counted. However, in an alternate embodiment, the table can be set up such that the number of clocks represents all clocks provided. Therefore, in block 216, a first clock count check point is selected, such as, for example, 20 clocks.

Note that, as will be used throughout the descriptions below, various different clock counters may be set up to keep track of different types of clock count. In one embodiment, clock counter 428 keeps track of the number of total test clocks. Other clock counters may include a check point counter (CPC) 556 and a load time to next check point counter (NCPC) 558 which will be described in further detail below, and in reference to FIG. 7. CPC 556 and NCPC 558 may be located in interrupt manager 422, illustrated in more detail in FIG. 7.

Referring back to FIG. 3, flow proceeds from block 216 to block 218 (via point D) where test stimulus is shifted in while shifting out test results to signature analyzer 112 for x clocks with SE 138 asserted. As described above, any number, x, of test input/output shift cycles may be performed, where x may be any integer greater than or equal to one. Also, in the illustrated embodiment, LBIST is being performed during the stop and test procedure. Therefore, referring to FIG. 2, stop and test controller 100, in response to stop and test indicator 24, provides start 160 to random pattern generator 102 (which, in one embodiment, is a pseudo random pattern generator) and asserts SE 138. In response to start 160, random pattern generator 102 begins providing pseudo random inputs to the scan chains via Sin1 108 and Sin2 110. (Note that as these inputs are being provided via Sin1 108 and Sin2 110, outputs are also being shifted out via Sout1 109 and Sout2 111.) Also, in one embodiment, CPC 556 and NCPC 558 are also decremented with each clock cycle, in which case, each can be decremented x times in block 218. Also, in one embodiment, clock counter 428 is also incremented with each clock, i.e. x times in block 218 to keep track of total test clock cycles. Alternatively, only testing cycles would be counted, in which case these counters are incremented or decremented only in block 220.

Flow then proceeds to block 220 where a system clock (e.g. clock 104) is provided with SE 138 negated (so as to provide a functional clock cycle) so that test outputs can be captured in the scan chains based on the test stimulus that was shifted in in block 218. Also, a functional test clock count is incremented, which keeps track of the clocks provided for functional cycles. In one embodiment, this functional test clock count is kept in test results register 118, where test results register 118 may include, for example, a functional test clock count field. That is, in one embodiment, test result register 118 may store a value quantifying the clock cycles. Alternatively, this clock count can be stored elsewhere within data processing system 10, where, as will be described below, the clock count field of test result register 118 may only store a clock count when a clock count check point is reached. In one embodiment, clock counter 428 is also incremented to continue to keep track of total test clock cycles (functional cycles as well as cycles to shift in stimulus and shift out results). In one embodiment, only a single clock counter may be used. Also, in one embodiment, CPC 556 and NCPC 558 are also decremented. Note that any number of system clocks can be provided in block 220, where the clock counters described in this paragraph can be incremented or decremented with each system clock provided in block 220.

Flow proceeds to decision diamond 221 where it is determined whether an interrupt has been received. For example, in one embodiment, data processing system 10 includes interrupt controller 20 which determines when an interrupt is received in data processing system 10. When an interrupt is received, it provides an interrupt indicator 22 and a corresponding interrupt level 23 of the interrupt to stop and test circuitry 14. If an interrupt has been received, flow proceeds through point B to decision diamond 502 of FIG. 4. In FIG. 4, it will be determined, based on the progress of the test, when to respond to an interrupt received from interrupt controller 20, and, when the interrupt is to be responded to, stop and test circuitry 14 asserts processor interrupt indicator 49. Upon asserting processor interrupt indicator 49, flow would return to the flow of FIG. 3 via point C and enter block 402. Details of FIG. 4 will be described in more detail below.

Referring back to FIG. 3, if, at decision diamond 221 an interrupt has not been received, flow proceeds to decision diamond 222 where it is determined whether the functional test clock count (of, e.g., test result register 118) has reached or exceeded the first clock count check point (i.e. the current check point). Note that in one embodiment, as described above, the functional test clock count field of test result register 118 only stores the functional test clock count when a clock count check point is reached, thus test result register 118 may always show the latest clock count check point reached. In this embodiment, the actual clock count of functional clock cycles which is incremented in block 220 and used to determine if the current check point has been reached or exceeded in decision diamond 222 may be stored elsewhere within processor 12 or data processing system 10, or may even be stored in another field of test result register 118. If, at decision diamond 222, the current clock count check point has not been reached or exceeded, flow returns to block 218 where more test stimulus is shifted in and more test results are shifted out and to block 220 where another functional clock cycle will be performed, in an attempt to reach the current check point.

If, at decision diamond 222, the functional test clock count has reached or exceeded the current check point, flow proceeds to block 224 where a signature calculated from the shifted-out test outputs (e.g. Sout1 109 and Sout2 111) is compared with the expected signature and a pass/fail indicator is adjusted accordingly. In one embodiment, test results register 118 also includes a pass/fail indicator which may be a single bit that remains a logic level one so long as the tests continue to indicate a pass, and becomes a logic level zero when the tests results in a fail (i.e. when the test results do not match the expected signature). Alternatively, a pass/fail indicator may be provided within test results register 118 for each clock count check point of the above table where a logic level one would indicate a pass at the corresponding check point and a logic level zero would indicate a fail at the corresponding check point, or vice versa. Alternatively, other methods of storing pass/fail results may be used.

Referring to FIG. 2, note that the test results shifted out from the scan chains via Sout1 109 and Sout2 111 are provided to signature analyzer 112. Signature analyzer 112 creates a signature 120 based on these outputs and provides signature 120 to signature comparator 114 via deMUX 416. (Note that signature 120 may also be referred to as error detection codes.) Since a saving of test state is not currently being performed, saving test state 408 is not asserted (e.g. a logic level zero) thus causing deMUX 416 to route signature 120 to signature comparator 114. Compare 126, which is provided by stop and test controller 100, enables a comparison. Also, expected signature storage 116 provides expected signature 115 to signature comparator 114 for the comparison. Since a restoring of test state is not currently being preformed, restoring test state 410 is not asserted (e.g. a logic level zero), thus allowing expected signature storage 116 to provide expected signature 115 for the comparison. The expected signature from expected signature storage 116 is selected based on signature identifier 124 received from stop and test controller 100. Therefore, stop and test controller 100 controls random pattern generator 102 and controls the selection of the expected signature accordingly. Note that a conventional pseudo random pattern generator and signature analyzer, as known in the art, may be used. Furthermore, the expected signatures stored in storage 116 may also be created as known in the art. For example, expected signatures can be calculated by simulation of the DUT.

Still referring to FIG. 2, signature comparator 114 compares signature 120 with expected signature 115 and provides compare result 122 to test results register 118. The appropriate pass/fail indicator in test results register 118 can then be updated as needed to reflect compare result 122. For example, if compare result 122 indicates a match, then pass/fail indicator is set to indicate a pass (such as being set to a logic level one). If, however, compare result 122 indicates a mismatch, then pass/fail indicator is set to indicate a fail (such as being cleared to a logic level zero).

Referring back to FIG. 3, flow proceeds to decision diamond 226 where it is determined whether a pass or fail was indicated as a result of the comparison in block 224. If a pass occurred (indicating, e.g., that signature 120 did match expected signature 115, as indicated by compare result 122), then flow proceeds to decision diamond 228. In decision diamond 228, it is again determined whether an interrupt has been received from interrupt controller 20. This interrupt, as described above, may be indicated to stop and test circuitry 14 via interrupt indicator 22. If an interrupt has been received, then, in one embodiment, it can be responded to (by, for example, asserting processor interrupt indicator 49 so that processor 12 can receive indication of the interrupt and respond to it accordingly), and flow proceeds to block 402.

In block 402, if the save/restore enable indicator is set, then the test state (i.e. test data) is saved to test state memory 406, as was described above. For example, the current values of random pattern generator 102, signature analyzer 112, test results register 118, clock counter 428, and the contents of the scan chains (such as from Sout1 109 and sout2 111) can be stored to cache 13 in the portion being used as test state memory 406. Furthermore, any other information needed for saving the test state which can later be restored (such as in block 400) can be stored in cache 13 at this point. Therefore, referring to FIG. 2, note that Sout1 109 and Sout2 111 are provided to test state memory 406, and although not illustrated so as not to complicate FIG. 2, signature analyzer 112, test result register 118, random pattern generator 102, and stop and test controller 100 can also all be coupled to test state memory 406 in which, for example, test state memory control 460 (described in reference to FIG. 6) can appropriately control where to store the information.

In one embodiment, when the test state is saved and then restored, it may be desirable to check for errors during the saving and restoring of the test state itself. This can be useful, for example, if parity or error checking and correction (ECC) bits in the memory are used instead to increase test state storage capacity. Therefore, in one embodiment, as illustrated in block 402 of FIG. 3, when save/restore enable indicator 418 is asserted and test state is saved, a test state expected signature can also be generated and saved. Note that the test state expected signature may also be referred to as a first set of error detection codes. For example, as illustrated in FIG. 2, when a test state is being saved, the contents of the saved test state (such as, for example, the contents of Sout1 109 and Sout2 111) can be used by signature analyzer 112 to generate an expected signature of that test data as it is being stored to test state memory 406. Furthermore, any additional test state information, such as the contents of other registers, may also be used (in addition to the contents of all the scan chains being saved) to generate the expected signature. This test state expected signature generated by signature analyzer 112 can then be stored, via deMUX 416, to test state expected signature storage 412. That is, if test state is being stored, then saving test state signal 408 is asserted (e.g. a logic level one), thus allowing signature 120 being generated by signature analyzer 112 to be routed to test state expected signature storage 412 rather than signature comparator 114.

Therefore, upon restoring test state (such as in block 400), the test state data that is being restored can also be provided to signature analyzer 112. For example, referring to FIG. 2, when test state is being restored, the contents of the scan chains are routed back to processor 12 (e.g. to Sin1 108 and Sin2 110) through switches such as switches 424 and 426 with restoring test state signal 410 asserted and are also provided from the data output of test memory 406 to signature analyzer 112. Signature analyzer 112 can then generate signature 120 from this test data being restored and, since saving test state signal 408 is not asserted (because a restoring test state is being performed), signature 120 is routed to signature comparator 114. Signature 120 generated from the test data being stored can also be referred to as a second set of error detection codes. Since the test state is being restored, restoring test state 410 is asserted, thus allowing test state expected signature storage 412 to provide expected signature 115 for comparison. Therefore, in response to compare 125, signature comparator 114 can compare signature 120 generated from the restored test state data to the test state expected signature to determine if the save or restore resulted in a failure prior to continuing testing. (That is, comparator 114 can compare the first set of error detection codes to the second set of error detection codes to determine if there was an error in the storage of the test data.) In one embodiment, if a failure is indicated upon restoring state (such as in block 400), then an error is indicated in test results register 118, and the test is aborted.

Referring back to FIG. 3, flow proceeds from block 402 to block 234 where another reset is performed. This reset is similar to the reset described in reference to block 214. Flow proceeds to block 236 where execution commences at a restore vector location. That is, a restore vector can be used to indicate where execution by processor 12 should resume. This restore vector may be restore vector 152 of FIG. 2 and stored within stop and test controller 100 (or elsewhere within stop and test circuitry 14). Alternatively, the effect of this restore vector could be inherent in the logic of processor 12, in which case, restore vector 152 in stop and test controller 100 would be unnecessary. Flow then proceeds to block 238 where the application state, if it was saved in block 210, is restored. Flow then returns to point A where user applications continue to execute.

Referring back to decision diamond 228, if an interrupt has not been received, flow proceeds from decision diamond 228 to decision diamond 230 where it is determined whether a maximum clock count has been reached. For example, in one embodiment, a maximum clock count may be used, where, in one embodiment, this maximum clock count may indicate completion of the test, or, alternatively, may indicate a timing out of the test. This maximum clock count may alternatively be used as a break-pointing method, stopping the test at a point of interest, and then, using the saved test state, examine the mechanism of a failure at the circuit level. If the maximum clock count has been reached, flow goes to block 404 where saved test state indicator 420 is cleared (e.g. to a logic level zero) and flow returns to decision diamond 228 to determined whether an interrupt has been received. (Also, as will be discussed further below, if a failure has been indicated, such as at block 227, flow also returns to decision diamond 228.) If the maximum clock count has been reached, testing does not continue, and instead, flow continues between decision diamonds 228 and 230 until an interrupt is received. At that point, processor interrupt indicator 49 is asserted and flow proceeds from decision diamond 228 to block 402, 234, etc., where normal operation resumes, as described above. (In an alternate embodiment, upon reaching the maximum clock count, the stop and test procedure stops and flow proceeds to block 234 where execution of the user application resumes without waiting for an interrupt.) If, at decision diamond 230, the maximum clock count has not yet been reached (and since no interrupt has yet been received to stop the stop and test procedure), flow proceeds to block 232 where a next clock count check point is selected as the current check point. For example, referring to the table above, the next clock count check point may refer to the next entry of 100 clocks.

Referring back to decision diamond 226, if a fail occurred (indicating, e.g., that signature 120 did not match expected signature 115, as indicated by compare result 122), then flow proceeds to block 227 where a failure is indicated. Note that indicating a failure can refer to the adjusting of the pass/fail indicator in test results register 118 described above in reference to block 224, or may also include providing an additional output indicating failure. Flow then proceeds to decision diamond 228 where it is determined whether an interrupt is received. Flow proceeds as was already described above in reference to decision diamond 228. Note that, in the illustrated embodiment, flow continues between decision diamonds 228 and 230 until an interrupt has been received, causing flow to continue to block 234, thus resuming normal operation (e.g., resuming execution of the user application), via the restore vector of block 236. Note that, in some embodiments, there may be a plurality of restore vectors based upon, for example, whether or not an error was detected, or based upon whether or not the test ran to completion.

Note that, in one embodiment, in block 402, even if save/restore enable indicator 418 is asserted, test state may not be saved, such as in the case that the maximum clock count has been reached or a failure has occurred prior to entering block 402.

Referring back to decision diamond 221, when interrupt indicator 22 is asserted, flow proceeds to decision diamond 502 of FIG. 4, via point B, where it will be determined, based on the progress of the test, when to respond to this interrupt. That is, in one embodiment, stop and test circuitry 14 may only respond to interrupts received from interrupt controller 20 (such as via interrupt indicator 22) if they have a certain minimum interrupt priority level. That is, stop and test circuitry 14 may mask out one or more interrupt levels such that they are not yet provided to processor 12. In one embodiment, the determination of which interrupt levels to mask is based on how far the test has progressed (e.g. based on how many test clocks have elapsed). For example, at the start of a test, such as from clock cycle 0 to a first number of progress points (e.g. test clocks, check points, etc.), only the highest level of interrupts may be recognized while all others are masked out. Then, as a second number of progress points (e.g. test clocks, check points, etc.) in the testing is reached (the second number being greater than the first number), more interrupts may be recognized while masking out fewer levels. Therefore, as the test progresses, an increasing number of interrupt levels are "allowed" by stop and test circuitry 14 to interrupt testing. In this manner, stop and test circuitry 14 acts as a filter to filter interrupts received from interrupt controller 20 prior to recognizing them and providing them to processor 12. Also, in one embodiment, stop and test circuitry 14 may determine to not yet recognize a received interrupt from interrupt controller 20 based on the progress of the test and how close testing is to subsequent check point. That is, in one embodiment, an interrupt response window time can be defined for each interrupt level such that, if the next clock check point is expected to occur within that interrupt response window defined by the interrupt response window time, then recognition of the interrupt is delayed to allow for the next check point to be reached and thus, more test results accumulated.

Figure 7:
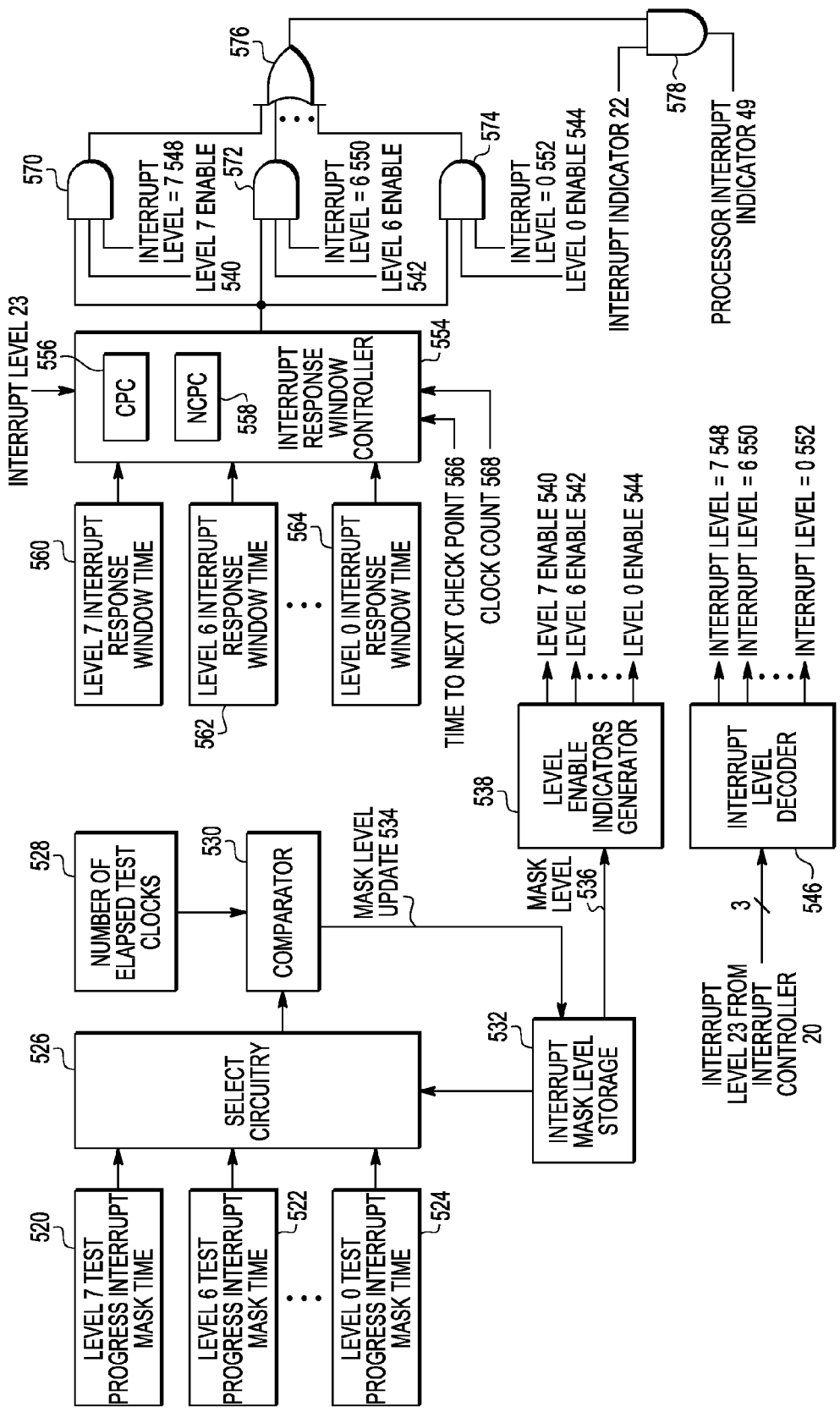
FIG. 7 illustrates, in block diagram form, the interrupt manager of the stop and test controller of the data processing system of FIG. 1, in accordance with one embodiment of the present invention.

For example, referring to FIG. 7, FIG. 7 illustrates a portion of interrupt manager 422 in accordance with one embodiment of the present invention. For the description of FIG. 7 (and FIG. 4), it will be assumed that there are 8 interrupt priority levels (levels 0 to 7, with level 0 having the lowest priority, and level 7 having the highest priority). Note that interrupt controller 20 may perform its own interrupt filtering and masking and will determine which interrupt to provide to stop and test circuitry 14 via interrupt indicator 22. Furthermore, interrupt controller 20 may identify priority levels of the interrupts it receives in its own manner; however, it provides a corresponding interrupt level 23 for each interrupt indicated by interrupt indicator 22, in which interrupt level 23 can be one of priority levels 7 to 0. Interrupt manager 422, in response to assertion of interrupt indicator 22, can determine when the interrupt will be provided to processor 12 for servicing.

Note also that, in some embodiments, the interrupt priority levels may actually be implemented directly in terms of the individual interrupts themselves, with no explicit notion of interrupt priorities. For example, if a method or apparatus involves a longer interrupt response window for a lower-priority interrupt, this effect may be implemented by directly assigning a longer interrupt response window to that specific interrupt, rather than by assigning a low priority to that interrupt, and assigning a longer interrupt response window to all low priority interrupts. In directly assigning a longer interrupt response time to an interrupt, it becomes a lower priority interrupt in that regard, so it is described here as a lower priority interrupt, even though no interrupt priority value is explicitly assigned to that interrupt.

Referring to FIG. 7, interrupt manager 422 includes select circuitry 526 and stores 8 test progress interrupt mask times (one for each of level 7 to level 0) which are coupled to select circuitry 526. For example, level 7 test progress interrupt mask time storage circuitry 520 stores a level 7 test progress interrupt mask time, level 6 test progress interrupt mask time storage circuitry 522 stores a level 6 test progress interrupt mask time, and level 0 test progress interrupt mask time storage circuitry 524 stores a level 0 test progress interrupt mask time. Interrupt manager 422 includes circuitry 528 for keeping track of the number of elapsed test clocks. In one embodiment, circuitry 528 may correspond to clock counter 428. Comparator 530 receives the number of elapsed test clocks from circuitry 528 and provides a mask level update signal 534 to interrupt mask level storage circuitry 532, which is also coupled to select circuitry 526 and provides a mask level signal 536 to level enable indicators generator 538. Level enable indicators generator 538 outputs a level enable signal for each interrupt level, level 7 to level 0, indicating whether or not interrupts at that level are masked. Therefore, in the illustrated embodiment, level enable indicators generator 538 outputs a level 7 enable indicator 540, a level 6 enable indicator 542, a level 0 enable indicator 544, etc.

In operation, levels of interrupts are increasingly enabled (unmasked) as the test progresses through various progress points. In one embodiment, as illustrated in FIG. 7, these progress points of the test correspond to elapsed test clocks. (Alternatively, other test parameters may be used to define progress points, other than elapsed test clocks.) In one embodiment, the test progress interrupt mask time for each of levels 7 to 0 indicate the number of test clocks which must have elapsed (i.e. the number of progress points which must have been reached) for the corresponding level of interrupt to be enabled. In one embodiment, initially, no interrupts are enabled and all of interrupt levels 7 to 0 are masked out. As the test progresses, each interrupt level, from highest (level 7) to lowest (level 0) is sequentially unmasked. For example, in the case of LBIST, one goal is to estimate an overall coverage or confidence level of the testing. As described in the table above, increased coverage is achieved as the number of test clocks increases. Furthermore, in the case of LBIST, the amount of coverage, in one example, increases in a logarithmic fashion towards an asymptotic level of about 90-95%. Therefore, during initial testing (e.g. from test clock 0 to an initial progress point), a greater increase in coverage is achieved as compared to an equal number of clocks of testing later in the test. This knowledge may therefore be used to select the progress points at which to enable various interrupt levels. That is, initially, as much uninterrupted testing as possible may be desired to gain the greatest increase in coverage, and once a certain progress point or number of progress points (e.g. a certain number of elapsed test clocks) is reached, then one or more interrupt levels can be unmasked.

Therefore, initially, interrupt mask level storage 532 of FIG. 7 may store an interrupt level of 7, meaning that all 8 levels are masked out. Level 7 is provided as mask level 536 to level enable indicators generator 538 which, in response thereto, can negate each of enable indicators 540 through 544, since all are masked out. Select circuitry 526, in response to interrupt mask level storage 532 storing a level of 7, selects level 7 test progress interrupt mask time, and when comparator 530 determines that the number of elapsed test clocks from circuitry 528 reaches the test progress interrupt mask time for level 7, comparator 530 asserts mask level update 534 such that interrupt mask level storage 532 can be updated to reflect the next level, level 6. Therefore, level 6 is now provided as mask level 536 to level enable indicators generator 538 which, in response thereto, asserts level 7 enable indicator 540 while negating the enable indicators for each of levels 6 through 0 since level 7 is no longer being masked. Select circuitry 526, in response to interrupt mask level storage 532 now storing a level of 6, selects level 6 test progress interrupt mask time, and when comparator 530 determines that the number of elapsed test clocks from circuitry 528 reaches the test progress interrupt mask time for level 6, comparator 530 asserts mask level update 534 such that interrupt mask level storage 532 can be updated to reflect the next level, level 5. As each progress point is reached (as the elapsed number of test clocks increases), a next interrupt level is unmasked, where the enable indicators for the unmasked levels are asserted by level enable indicators generator 538.

Interrupt manager 422 also includes an interrupt level decoder 546 which receives interrupt level 23 from interrupt controller 20 (which, in one embodiment, may be a 3 bit value indicating the level of the currently pending interrupt), and outputs an interrupt level indicator which indicates the interrupt level of the currently recognized interrupt. Therefore, in the illustrated embodiment, interrupt level decoder 546 outputs an "interrupt level=7" signal 548 (which, when asserted, indicates the current interrupt 7), an "interrupt level=6" signal 550 (which, when asserted, indicates the current interrupt level is 6), an "interrupt level=0" signal 552 (which, when asserted, indicates the current interrupt level is 0), etc.

Interrupt manager 422 also stores an interrupt response window time for each of levels 0 through 7. For example, level 7 interrupt response window time storage circuitry 560 stores an interrupt response window time for a level 7 interrupt, level 6 interrupt response window time storage circuitry 562 stores an interrupt response window time for a level 6 interrupt, and so forth, through the level 0 interrupt response window time storage circuitry 564 which stores an interrupt response window time for a level 0 interrupt. These are coupled to interrupt response window controller 554 which includes CPC 556 and NCPC 558. Interrupt response window controller 554 receives interrupt level 23, time to next clock check point 566 and a clock count 568 (which can correspond to clock counter 428). Interrupt response window controller 554 provides an output to a plurality of AND gates, one corresponding to each of levels 7 to 0. For example, this output is provided to AND gates 570, 572, and 574. Each AND gate receives an indication of whether the corresponding interrupt level is masked or not and an indication of what the current interrupt level of the currently pending interrupt is. For example, AND gate 570 receives the output from interrupt response window controller 554, level 7 enable indicator 540 and "interrupt level=7" signal 548. AND gate 572 receives the output from interrupt response window controller 554, level 6 enable indicator 542 and "interrupt level=6" signal 550. AND gate 574 receives the output from circuitry 554, level 0 enable indicator 544 and "interrupt level=0" signal 552.

Interrupt response window controller 554, using the interrupt response window times, can determine whether a received interrupt (i.e. the currently pending interrupt) should be delayed prior to responding in order to allow for a subsequent check point to be reached first or not (more details of which will be described in reference to FIG. 4). For example, in one embodiment, interrupt response window controller 554 selects an interrupt response window time corresponding to the level indicated by interrupt level 23. Based on the amount of time to the next check point (indicated by time to next check point 566 received by interrupt response window controller 554), interrupt response window controller 554 determines whether responding to the current interrupt should be delayed. In one embodiment, interrupt response window controller 554 determines whether the next check point will occur within the selected interrupt response window time (i.e. the interrupt response window associated with the current interrupt provided by interrupt indicator 22). If it will, then responding to the interrupt can be delayed since a next check point can be reached and thus allow for more test results to be accumulated. If the next check point will not occur within the interrupt response window time, then the interrupt need not be delayed since no additional test results will be accumulated. For a higher interrupt level, the interrupt response window time (which corresponds to the maximum amount of time for which response to the corresponding interrupt level can be delayed) can be shorter than for a lower interrupt level. This may help ensure that higher priority interrupts are delayed less time as compared to a lower priority interrupt. Furthermore, it may be possible that multiple check points may be expected to occur within the interrupt response window time of a current interrupt. In this case, it may be possible to delay the current interrupt until the latest check point expected to occur within the interrupt response window time of a current interrupt is reached.

As described herein, the check points described above are used to determine how interrupts are delayed. Note that progress points refer to any point within the progress of the testing, whereas check points are progress points where testing results are checked. In the illustrated embodiment, in which the check points are used to determine how the interrupts are delayed, these check points may also be referred to as progress points. In alternate embodiments, other progress points may be used to determine how interrupts are delayed. For example, these progress points may correspond to points in the testing in which other factors or conditions are met, in which testing results may or may not be checked.

Therefore, if interrupt response window controller 554 determines, based on the interrupt response window time corresponding to interrupt level 23 of a current interrupt indicated by interrupt indicator 22 as well as the time to the next check point, that the current interrupt should be responded to, it asserts its output and provides this output to the plurality of AND gates. Therefore, for each AND gate, its output is asserted when the output of interrupt response window controller 554 is asserted (to indicate, for example, that there is an interrupt which should be responded to), the corresponding interrupt level is not masked out (thus the corresponding level enable indicator output by level enable indicators generator 538 is asserted) and the corresponding interrupt level is the interrupt level indicated by interrupt level 23. Therefore, so long as there is an interrupt to be responded to corresponding to a current interrupt whose interrupt level is not masked, an output of one of the AND gates will be asserted. The output of the AND gates are provided to OR gate 576. The output of OR gate 576 is asserted whenever any one of the outputs of the AND gates is asserted and is provided to a first input of AND gate 578. AND gate 578 receives interrupt indicator 22 at a second input and provides processor interrupt indicator 49. Therefore, if the output of AND gate 576 indicates there is an interrupt to be responded to that is not masked out and interrupt indicator 22 is currently asserted, then processor interrupt indicator 49 will be asserted to indicate that an interrupt is to be responded to by processor 12.

Referring back to FIG. 4, at decision diamond 502, it is determined whether CPC 556 and NCPC 558 have been loaded since the most recent assertion of processor interrupt 49 or since the currently recognized interrupt (the interrupt currently pending and indicated by asserted interrupt indicator 22) has changed. Note that, in one embodiment, the interrupts are level-sensitive, meaning that they stay asserted until serviced by the processor core. Therefore, flow proceeds through 502 not only when the interrupt initially asserts, but on every cycle thereafter, until the processor core services the interrupt. If CPC and NCPC have not been loaded since the currently recognized interrupt asserted or changed, then flow proceeds to block 504 in which CPC 556 is loaded with level N interrupt response window time. That is, CPC 556 is loaded with the interrupt response window time of the level of interrupt indicated by interrupt level 23. Flow then proceeds to block 506 in which NCPC 558 is loaded with the time to the next check point (corresponding, for example, to time to next check point 566 provided to interrupt response window controller 554). Flow then proceeds to decision diamond 508 in which it is determined if the test progress interrupt mask time for the current interrupt indicated by interrupt indicator 22 has been met. That is, at this point, it is determined whether the current interrupt is masked or not. If the test progress interrupt mask time (e.g., selected by select circuitry 526) has not been met for the level indicated by interrupt level 23, then that level of interrupt is still masked, and flow proceeds back to block 218 via point D where testing continues. That is, since the interrupt level of the current interrupt is masked, it cannot yet be responded to. If, however, the test progress interrupt mask time has been met for the level indicated by interrupt level 23, then that level of interrupt is not masked, and flow can proceed to decision diamond 510.

At decision diamond 510, it is determined whether CPC 556 (the interrupt response window time) will expire before the next check point is reached. If so (indicating that NCPC>CPC), then there is no need to delay the interrupt. That is, since the interrupt response window time of the level of interrupt indicated by interrupt level 23 is not long enough to allow for the next check point to be reached, even delaying the interrupt by its maximum interrupt response window would not allow for more test results to be accumulated at a next check point. Therefore, flow can proceed to block 512 in which processor interrupt indicator 49 is asserted to allow processor 12 to respond to the interrupt without additional delay. Flow then proceeds back to block 402 of FIG. 3 via point C. However, if CPC 556 will not expire before the next check point is reached (indicating that NCPC<=CPC), then processor interrupt indicator 49 is not asserted, and response to the current interrupt by processor 12 is delayed. Flow proceeds to decision diamond 514 in which it is determined whether NCPC has expired. If not, flow continues to block 218 via point D, to continue testing. If so, then NCPC 558 is again loaded with the time to the next check point (corresponding, for example, to time to next check point 566 provided to interrupt response window controller 554). This re-loading of NCPC 558 with the time to the next check point (the path from decision diamond 514 to block 506) may occur, for example, in the case in which more than one check point may be reached within the interrupt response window time of the current interrupt (i.e. during the interrupt response window of the current interrupt). If more than one check point's worth of testing can be accumulated within the interrupt response window, interrupt response window controller 554 can take advantage of this opportunity. Therefore, each time a check point is reached, NCPC 558 can be loaded to reflect a subsequent check point to see if the current interrupt can be delayed to capture an additional check point (i.e. to capture more than one check point).

Therefore, when flow returns to block 218, via points D of FIG. 4, note that CPC 556 and NCPC 558 are used to keep track of the remaining clocks in the interrupt response window and the time to the next check point, respectively. That is, these counters are decremented as testing continues (as done, for example, in blocks 218 and 220 of FIG. 3).

Therefore, the flow of FIG. 4 allows interrupt manager 422 the ability to delay interrupts from being responded to by processor 12 (and thus delay asserting processor interrupt indicator 49) based on a variety of factors. In this manner, interrupt manager 422 (and thus, stop and test circuitry 14) is able to filter interrupts from interrupt controller 20 to processor 12. Interrupt manager 422 may therefore help balance testing coverage with processor performance, as needed within a system. Note that, in alternate embodiments, portions of interrupt manager 422 may be implemented in interrupt controller 20. Also, the functionality of FIG. 4 can be achieved in a variety of different ways, using, for example, circuitry other than that illustrated in FIG. 7.

In the illustrated embodiment, interrupt manager 422 is able to both mask interrupts as well as delay interrupts based on an interrupt response window for the particular interrupt. However, in an alternate embodiment, interrupt manager 422 may perform the interrupt masking and not delay interrupts based on the interrupt response window. Or, in another alternate embodiment, interrupt manager 422 may not mask interrupts but may still delay interrupts based on the interrupt response window. That is, interrupt manager 422 can be implemented using all or a portion of the functionality illustrated in FIGS. 4 and 7.

FIG. 3 was described in reference to LBIST testing being performed during the stop and test procedure. However, in alternate embodiments, other types of scan testing may be performed. Alternatively, other types of testing, including testing which scrambles a processor's state, other than or in addition to scan testing may be performed during the stop and test procedure. In these cases, stop and test circuitry 14 may include different circuitry or additional circuitry from that illustrated in FIG. 2 to accomplish the desired type or types of testing. Furthermore, note that the flow of FIG. 3 is one example, and that alternate flows may be used which include additional steps, which include less steps, or which combine steps.

Also, note that the descriptions above describe scan testing where test stimulus are shifted into the scan chains and test outputs are shifted out of the scan chains. However, in alternate embodiments, test stimulus may be applied differently. For example, they may be loaded into the scan chain or scan chains in parallel. Similarly, the scan test outputs may be read from the scan chain or scan chains in parallel.

Therefore, it can be appreciated how various embodiments of the present invention, such as, for example, the flow of FIG. 3, allow for software directed intrusive testing during normal operation such that a data processing system, a processor, or portions thereof, can be intrusively tested after leaving the factory and during normal operation such as in an end user application. Since it is the software of processor 12 which "has knowledge" of when processor 12 itself is idle or is otherwise able to be intrusively tested, the ability for software running on processor 12 to be able to control how and when this intrusive testing is performed (through the use, for example, of stop and test indicator 24) may allow for improved testing during normal operation in an end user application. Furthermore, in various embodiments described above, the test state can be saved and restored during testing. In this manner, more complete testing can be achieved, even when the testing is only preformed during idle periods of the application. In other embodiments described above, testing efficiency may further be improved by masking interrupts based on the progress of the test and/or by delaying interrupts based on the progress of the test.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of system 10 are circuitry located on a single integrated circuit or within a same device. Alternatively, system 10 may include any number of separate integrated circuits or separate devices interconnected with each other. Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the software described herein may be received elements of system 10, for example, from computer readable media such as memory 18 or other media on other computer systems. Such computer readable media may be permanently, removably or remotely coupled to an information processing system such as system 10. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

Although the invention is described herein with reference to specific embodiments, various modifications and changes can be made without departing from the scope of the present invention as set forth in the claims below. For example, other types of cache may be used as test state memory 406, or other types of memory all together. Also, different types of circuitry may be used to implement interrupt manager 422. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The following are various embodiments of the present invention.

Item 1 includes a method for handling an interrupt during testing of at least one logic block of a processing, the method including performing a test on at least one logic block of a processor; during the performing, receiving an interrupt; determining a progress status of the test in response to receiving the interrupt; and determining when the processor responds to an interrupt, wherein the determining when the processor responds to an interrupt is based on the progress of the test. Item 2 includes the method of item 1, wherein: the determining the progress status includes determining an amount of the test that has been completed by the performing of the test; and the determining when the processor responds to an interrupt includes determining whether to mask the interrupt, wherein the determining whether to mask is based on the amount of the test that has been completed. Item 3 includes the method of item 2, and further includes not masking the interrupt if the amount of the test that has been completed is greater than a predetermined amount of the test. Item 4 include the method of item 2, wherein: the interrupt is characterized as being of an interrupt priority level of a plurality of interrupt priority levels; and the determining whether to mask the interrupt is based on the interrupt priority level. Item 5 includes the method of item 4, wherein interrupts of a higher interrupt priority level of the plurality of interrupt priority levels are masked for a first number of initial progress points of the test, wherein interrupts of a lower interrupt priority level of the plurality of interrupt priority levels are masked for a second number of initial progress points of the test, wherein the first number is less than the second number. Item 6 includes the method of item 1, wherein the determining when the processor responds to the interrupt includes determining a time until a subsequent progress point of the test. Item 7 includes the method of item 6, wherein the determining when the processor responds to the interrupt includes determining a latest in time occurring subsequent progress point of the test that occurs within an interrupt response window associated with the interrupt. Item 8 includes the method of item 1, wherein the determining when the processor responds to the interrupt, includes determining whether to delay responding to the interrupt until a subsequent progress point of a plurality of progress points of the test has been reached. Item 9 includes the method of item 8, wherein the determining whether to delay responding to the interrupt until a subsequent progress point of the plurality of progress points of the test has been reached includes determining whether a time to the next progress point is within an interrupt response window of the interrupt. Item 10 includes the method of item 9, wherein the interrupt is of an interrupt priority level of a plurality of interrupt priority levels, wherein each interrupt priority level includes a corresponding interrupt response window, wherein interrupts of a higher interrupt priority level of the plurality of interrupt priority levels have a shorter interrupt response window than interrupts of a lower interrupt priority level of the plurality of interrupt priority levels. Item 11 includes the method of item 1, wherein: the determining when the processor responds to the interrupt includes determining whether to mask the interrupt, wherein the determining whether to mask is based on the amount of the test that has been completed; and the determining when the processor responds to the interrupt includes determining whether to delay responding to the interrupt until a subsequent progress point of a plurality of progress points of the test has been reached. Item 12 includes the method of item 1, wherein the determining when the processor responds to the interrupt includes determining a time until a next subsequent progress point of a plurality of progress points of the test, and the method further includes stopping the test and providing an indication to the processor to respond to the interrupt based upon a determination that the time until the next subsequent progress point is greater than an interrupt response window of the interrupt. Item 13 includes the method of item 1, wherein: the determining when the processor responds to the interrupt results in a delay in providing the indication of the interrupt to the processor, wherein during the delay, a second interrupt is received; and if the second interrupt is of a higher priority level than the interrupt, determining when the processor responds to the second interrupt, wherein the determining when the processor responds to the second interrupt is based on the progress of the test, wherein an indication of the second interrupt is provided to the processor at an earlier time than an indication of the interrupt.

Item 14 includes a data processing system including a processor; test circuitry, the test circuitry for performing testing on at least one logic block of the processor; and interrupt control circuitry coupled to the processor to provide an interrupt indication to the processor, wherein the interrupt control circuitry includes interrupt delay circuitry for delaying providing the interrupt indication to the processor during a test performed by the test circuitry based on the progress of the test. Item 15 includes the data processing system of item 14, wherein the interrupt control circuitry masks the interrupt from the processor during a test based upon whether a sufficient amount of the test has been completed. Item 16 includes the data processing system of item 15, wherein the interrupts received by the interrupt control circuitry are at a plurality of interrupt priority levels, wherein the sufficient amount of the test is dependent upon the interrupt priority level of the interrupt. Item 17 includes the data processing system of item 16, wherein the sufficient amount of the test for interrupts of a first interrupt priority level of the plurality of interrupt priority levels is longer than the sufficient amount of the test for interrupts of a second interrupt priority level of the plurality of interrupt priority levels, wherein the second interrupt priority level is a higher interrupt priority level than the first interrupt priority level. Item 18 includes the data processing system of item 14, wherein the interrupt control circuitry delays providing the indication of the interrupt to the processor in response to a determination that a subsequent check point of the test is within an interrupt response window of the interrupt. Item 19 includes the data processing system of item 14, wherein the interrupt control circuitry is capable of receiving interrupts of a plurality of interrupt priority levels, wherein each interrupt priority level includes a corresponding interrupt response window, wherein a first interrupt priority level of the plurality of interrupt priority levels has longer interrupt response window than a second interrupt priority level of the plurality of interrupt priority levels that is of a higher interrupt priority level than the first interrupt priority level. Item 20 includes the data processing system of item 14, wherein the testing circuit performs a scan chain test on the at least one logic block, wherein the interrupt control circuitry includes interrupt delay circuitry for delaying providing the interrupt indication to the processor during a test based on the progress of the scan chain test.

What is claimed is:

1. A method for handling an interrupt during testing of at least one logic block of a processor, the method comprising:
   performing a test on at least one logic block of a processor;
   during the performing, receiving an interrupt;
   determining a progress status of the test in response to receiving the interrupt; and
   determining when the processor responds to an interrupt, wherein the determining when the processor responds to an interrupt is based on the progress of the test,
   wherein:
      the determining the progress status includes determining an amount of the test that has been completed by the performing of the test; and
      the determining when the processor responds to an interrupt includes determining whether to mask the interrupt, wherein the determining whether to mask is based on the amount of the test that has been completed.

2. The method of claim 1 further comprising:
   not masking the interrupt if the amount of the test that has been completed is greater than a predetermined amount of the test.

3. The method of claim 1 wherein:
   the interrupt is characterized as being of an interrupt priority level of a plurality of interrupt priority levels; and
   the determining whether to mask the interrupt is based on the interrupt priority level.

4. The method of claim 3 wherein interrupts of a higher interrupt priority level of the plurality of interrupt priority levels are masked for a first number of initial progress points of the test, wherein interrupts of a lower interrupt priority level of the plurality of interrupt priority levels are masked for a second number of initial progress points of the test, wherein the first number is less than the second number.

5. The method of claim 1 wherein the determining when the processor responds to the interrupt includes determining a time until a subsequent progress point of the test.

6. The method of claim 5 wherein the determining when the processor responds to the interrupt includes determining a latest in time occurring subsequent progress point of the test that occurs within an interrupt response window associated with the interrupt.

7. A method for handling an interrupt during testing of at least one logic block of a processor, the method comprising:
performing a test on at least one logic block of a processor;
during the performing, receiving an interrupt;
determining a progress status of the test in response to receiving the interrupt; and
determining when the processor responds to an interrupt, wherein the determining when the processor responds to an interrupt is based on the progress of the test
wherein:
the determining when the processor responds to the interrupt, includes determining whether to delay responding to the interrupt until a subsequent progress point of a plurality of progress points of the test has been reached,
the determining whether to delay responding to the interrupt until a subsequent progress point of the plurality of progress points of the test has been reached includes determining whether a time to the next progress point is within an interrupt response window of the interrupt, and
the interrupt is of an interrupt priority level of a plurality of interrupt priority levels, wherein each interrupt priority level includes a corresponding interrupt response window, wherein interrupts of a higher interrupt priority level of the plurality of interrupt priority levels have a shorter interrupt response window than interrupts of a lower interrupt priority level of the plurality of interrupt priority levels.

8. A method for handling an interrupt during testing of at least one logic block of a processor, the method comprising:
performing a test on at least one logic block of a processor;
during the performing, receiving an interrupt;
determining a progress status of the test in response to receiving the interrupt; and
determining when the processor responds to an interrupt, wherein the determining when the processor responds to an interrupt is based on the progress of the test,
wherein:
the determining when the processor responds to the interrupt includes determining whether to mask the interrupt, wherein the determining whether to mask is based on the amount of the test that has been completed; and
the determining when the processor responds to the interrupt includes determining whether to delay responding to the interrupt until a subsequent progress point of a plurality of progress points of the test has been reached.

9. A method for handling an interrupt during testing of at least one logic block of a processor, the method comprising:
performing a test on at least one logic block of a processor;
during the performing, receiving an interrupt;
determining a progress status of the test in response to receiving the interrupt; and
determining when the processor responds to an interrupt, wherein the determining when the processor responds to an interrupt is based on the progress of the test,
wherein the determining when the processor responds to the interrupt includes determining a time until a next subsequent progress point of a plurality of progress points of the test, the method further comprising:
stopping the test and providing an indication to the processor to respond to the interrupt based upon a determination that the time until the next subsequent progress point is greater than an interrupt response window of the interrupt.

10. A method for handling an interrupt during testing of at least one logic block of a processor, the method comprising:
performing a test on at least one logic block of a processor;
during the performing, receiving an interrupt;
determining a progress status of the test in response to receiving the interrupt; and
determining when the processor responds to an interrupt, wherein the determining when the processor responds to an interrupt is based on the progress of the test,
wherein:
the determining when the processor responds to the interrupt results in a delay in providing the indication of the interrupt to the processor, wherein during the delay, a second interrupt is received; and
if the second interrupt is of a higher priority level than the interrupt, determining when the processor responds to the second interrupt, wherein the determining when the processor responds to the second interrupt is based on the progress of the test, wherein an indication of the second interrupt is provided to the processor at an earlier time than an indication of the interrupt.

11. A data processing system comprising:
a processor;
test circuitry, the test circuitry for performing testing on at least one logic block of the processor, and
interrupt control circuitry coupled to the processor to provide an interrupt indication to the processor, wherein the interrupt control circuitry includes interrupt delay circuitry for delaying providing the interrupt indication to the processor during a test performed by the test circuitry based on the progress of the test,
wherein the interrupt control circuitry masks the interrupt from the processor during a test based upon whether a sufficient amount of the test has been completed.

12. The data processing system of claim 11 wherein the interrupts received by the interrupt control circuitry are at a plurality of interrupt priority levels, wherein the sufficient amount of the test is dependent upon the interrupt priority level of the interrupt.

13. The data processing system of claim 12 wherein the sufficient amount of the test for interrupts of a first interrupt priority level of the plurality of interrupt priority levels is longer than the sufficient amount of the test for interrupts of a second interrupt priority level of the plurality of interrupt priority levels, wherein the second interrupt priority level is a higher interrupt priority level than the first interrupt priority level.

14. The data processing system of claim 11 wherein the interrupt control circuitry delays providing the indication of the interrupt to the processor in response to a determination that a subsequent check point of the test is within an interrupt response window of the interrupt.

15. A data processing system comprising:
a processor;
test circuitry, the test circuitry for performing testing on at least one logic block of the processor, and
interrupt control circuitry coupled to the processor to provide an interrupt indication to the processor, wherein the interrupt control circuitry includes interrupt delay circuitry for delaying providing the interrupt indication to the processor during a test performed by the test circuitry based on the progress of the test, wherein the interrupt control circuitry is capable of receiving interrupts of a plurality of interrupt priority levels, wherein each interrupt priority level includes a corresponding interrupt response window, wherein a first interrupt priority level of the plurality of interrupt priority levels has a longer interrupt response window than a second interrupt priority level of the plurality of interrupt priority levels that is of a higher interrupt priority level than the first interrupt priority level.

16. The data processing system of claim 11 wherein the testing circuit performs a scan chain test on the at least one logic block, wherein the interrupt control circuitry includes interrupt delay circuitry for delaying providing the interrupt indication to the processor during a test based on the progress of the scan chain test.

* * * * *